United States Patent
Mathews et al.

(10) Patent No.: US 7,769,628 B2
(45) Date of Patent: Aug. 3, 2010

(54) SYSTEMS, METHODS AND COMPUTER PROGRAM PRODUCTS FOR MODELING UNCERTAIN FUTURE DEMAND, SUPPLY AND ASSOCIATED PROFITABILITY OF A GOOD

(75) Inventors: Scott H. Mathews, Seattle, WA (US); Kyle M. Nakamoto, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 764 days.

(21) Appl. No.: 11/190,711

(22) Filed: Jul. 27, 2005

(65) Prior Publication Data

US 2005/0273379 A1    Dec. 8, 2005

Related U.S. Application Data

(63) Continuation-in-part of application No. 10/453,396, filed on Jun. 3, 2003, and a continuation-in-part of application No. 10/453,727, filed on Jun. 3, 2003, now Pat. No. 7,627,495.

(51) Int. Cl.
*G06F 17/30* (2006.01)
*G07G 1/00* (2006.01)
(52) U.S. Cl. ........................................... 705/10
(58) Field of Classification Search ............... None
See application file for complete search history.

(56) References Cited

U.S. PATENT DOCUMENTS 5,377,095 A * 12/1994 Maeda et al. ............. 705/10

(Continued)

FOREIGN PATENT DOCUMENTS

EP    1 178 416 A1    2/2002

(Continued)

OTHER PUBLICATIONS

Eric L. Burgess, Hany S. Gobrieal; *Integrating Spacecraft Design and Cost-Risk Analysis Using NASA Technology Readiness Levels*; Feb. 1996; 29th Annual DoD Cost Analysis Symposium, Leesburg, Virginia; 14 pages; The Aerospace Corporation; Herndon, Virginia.

(Continued)

*Primary Examiner*—Romain Jeanty
*Assistant Examiner*—Brandi P Parker
(74) *Attorney, Agent, or Firm*—Alston & Bird LLP

(57) ABSTRACT

A method is provided that includes modeling future demand and/or future supply for a good at one or more segments of a period of time. In accordance with the method, future demand/supply at a respective time segment is modeled based upon a price sensitivity distribution of a unit purchase of the good, as well as a market potential distribution of a number of units of the good in a market associated with the good, during the respective time segment. The price sensitivity distribution and/or the market potential distribution for a respective time segment is based upon a growth rate and an uncertainty for the respective time segment. The method can further include modeling cost and/or profitability of the good at a respective time segment. Profitability can be modeled based upon the demand model and the cost model for the respective time segment.

36 Claims, 15 Drawing Sheets

U.S. PATENT DOCUMENTS

| | | | |
|---|---|---|---|
| 5,692,233 A | | 11/1997 | Garman |
| 5,710,578 A | | 1/1998 | Beauregard et al. |
| 5,960,407 A | * | 9/1999 | Vivona ........................ 705/10 |
| 6,061,662 A | | 5/2000 | Makivic |
| 6,078,893 A | | 6/2000 | Ouimet et al. |
| 6,078,901 A | * | 6/2000 | Ching ...................... 705/36 R |
| 6,157,918 A | | 12/2000 | Shepherd |
| 6,205,431 B1 | | 3/2001 | Willemain et al. |
| 6,321,205 B1 | | 11/2001 | Eder |
| 6,321,212 B1 | | 11/2001 | Lange |
| 6,381,586 B1 | | 4/2002 | Glasserman et al. |
| 6,393,406 B1 | | 5/2002 | Eder |
| 6,629,082 B1 | | 9/2003 | Hambrecht et al. |
| 6,810,332 B2 | | 10/2004 | Harrison |
| 6,853,952 B2 | | 2/2005 | Chadwick |
| 6,862,579 B2 | | 3/2005 | Mathews et al. |
| 6,910,017 B1 | * | 6/2005 | Woo et al. ..................... 705/10 |
| 6,963,854 B1 | * | 11/2005 | Boyd et al. ................... 705/37 |
| 7,085,734 B2 | | 8/2006 | Grant et al. |
| 7,110,956 B1 | | 9/2006 | Drake et al. |
| 7,133,848 B2 | * | 11/2006 | Phillips et al. .............. 705/400 |
| 7,197,474 B1 | | 3/2007 | Kitts |
| 7,315,842 B1 | | 1/2008 | Wang |
| 7,349,878 B1 | | 3/2008 | Makivic |
| 7,398,221 B1 | | 7/2008 | Bensoussan et al. |
| 7,574,394 B2 | | 8/2009 | Chorna et al. |
| 2001/0041996 A1 | | 11/2001 | Eder |
| 2002/0010667 A1 | | 1/2002 | Kant et al. |
| 2002/0116348 A1 | * | 8/2002 | Phillips et al. .............. 705/400 |
| 2002/0143604 A1 | * | 10/2002 | Cox et al. ..................... 705/10 |
| 2003/0014337 A1 | | 1/2003 | Mathews et al. |
| 2003/0033191 A1 | | 2/2003 | Davies et al. |
| 2003/0078870 A1 | | 4/2003 | Datar et al. |
| 2003/0115128 A1 | | 6/2003 | Lange et al. |
| 2003/0144897 A1 | | 7/2003 | Burruss et al. |
| 2003/0236738 A1 | | 12/2003 | Lange et al. |
| 2004/0068455 A1 | | 4/2004 | Jacobus et al. |
| 2004/0098327 A1 | | 5/2004 | Seaman |
| 2004/0128221 A1 | | 7/2004 | Pandher |
| 2004/0249642 A1 | | 12/2004 | Mathews et al. |
| 2005/0102213 A1 | | 5/2005 | Savasoglu et al. |
| 2005/0125318 A1 | | 6/2005 | Jameson |
| 2006/0253355 A1 | | 11/2006 | Shalen |
| 2007/0011065 A1 | | 1/2007 | Sreenivasan et al. |
| 2007/0022031 A1 | | 1/2007 | Sponholtz et al. |
| 2007/0050282 A1 | | 3/2007 | Chen et al. |
| 2007/0106576 A1 | | 5/2007 | Jung et al. |
| 2007/0112661 A1 | | 5/2007 | Mathews |
| 2007/0150390 A1 | | 6/2007 | Mathews et al. |
| 2007/0150391 A1 | | 6/2007 | Mathews et al. |
| 2007/0150392 A1 | | 6/2007 | Mathews et al. |
| 2007/0150393 A1 | | 6/2007 | Mathews et al. |
| 2007/0150394 A1 | | 6/2007 | Mathews et al. |
| 2007/0150395 A1 | | 6/2007 | Nakamoto et al. |
| 2007/0162376 A1 | | 7/2007 | Mathews et al. |
| 2007/0299753 A1 | | 12/2007 | Averbuch et al. |
| 2008/0015871 A1 | | 1/2008 | Eder |
| 2008/0109341 A1 | | 5/2008 | Stiff et al. |
| 2008/0147568 A1 | | 6/2008 | Wang |
| 2008/0167984 A1 | | 7/2008 | Courey et al. |
| 2008/0208678 A1 | | 8/2008 | Walser et al. |
| 2008/0228605 A1 | | 9/2008 | Wang |
| 2008/0288394 A1 | | 11/2008 | Eder |
| 2009/0030822 A1 | | 1/2009 | Cresswell |
| 2009/0043604 A1 | | 2/2009 | Jung et al. |
| 2009/0043683 A1 | | 2/2009 | Jung et al. |
| 2009/0099955 A1 | | 4/2009 | Peters et al. |

FOREIGN PATENT DOCUMENTS

| | | | |
|---|---|---|---|
| JP | 2001357189 A | | 12/2001 |

OTHER PUBLICATIONS

Ray Nelson; Risk Analysis Using @Risk® and Crystal Ball®; *Oracle of IIF*; Dec. 2000; pp. 8-11.

John M. Charnes; *Using Simulation for Option Pricing*, Dec. 2000; pp. 151-157; *Proceedings of the 2000 Winter Simulation Conference*, Orlando, Florida.

*Risk Analysis Overview—What is Risk?*; Available at <http://www.decisioneering.com/risk-analysis-print.html> (visited Feb. 19, 2002).

*Real Options with Monte Carlo Simulation*; Available at <http://www.puc-rio.br/marco.ind/monte-carlo.html> (visited Feb. 25, 2002).

*Cone of Uncertainty*; Available at <http://www.real-options.com/cou.html> (visited Oct. 11, 2002).

Weston Copeland; *Managerial Finance*; 1990; pp. 481-487, 406-407, 642 (10 pages); $9^{th}$ Edition; ISBN 0 03 0558832.

Alan Shapiro; *Modern Corporate Finance*; 1990; pp. 438, 261; ISBN 002409530-3.

Felstead, "A Mathematical Approach to Cost Minimization of Satcom Systems", 1996, IEEE, pp. 352-356.

Morrison, "Life Cycle Approach to New Product Forecasting", Summer 1995, *The Journal of Business Forecasting Methods & Systems*, 14, 2, ABI/INFORM Global, p. 3.

Eskin, "Dynamic Forecast of New Product Demand Using a Depth of Repeat Model", May 1973, *JMR Journal of Marketing Research*, 10, 0000002, AB/INFORM Global, p. 115.

Bassin, "The Logistic Curve—another approach to new product forecasting", Fall 1991, *The Journal of Business Forecasting Methods & Systems*, 10, 3, ABI/INFORM Global, p. 14.

Paszko et al., "Product Life Cycles and Profitability", Summer 1989, *The Journal of Business Forecasting Methods & Systems*, 8, 2; ABI/INFORM Global, p. 26.

Nelson, "The Product Life Cycle of Engineered Metals: a comparative analysis of the application of product life cycle theory", Spring 1992, *The Journal of Business & Industrial Marketing*, 7, 2, ABI/INFORM Global, p. 5.

Curry, "FALCCM-H: Functional Avionics Life Cycle Cost Model for Hardware", © 1993, IEEE, pp. 950-953.

Xie et al., "Probabilistic Design Optimization of Aircraft Structures with Reliability, Manufacturability, and Cost Constraints", Apr. 7-10, 2003, $44^{th}$ AIAA/ASME/ASCE/AHS Structures, Structural Dynamics, and Materials Conference, Norfolk, VA, p. 1.

Marx et al., "Knowledge-based manufacturing and structural design for a high speed civil transport", 1994, $1^{st}$ Industry / Academy Symposium on Research for Future Supersonic and Hypersonic Vehicles, Greensboro, NC pp. 1-6.

Schrage, "Technology for Rotorcraft Affordability Through Integrated Product/Process Development (IPPD)", 1999, American Helicopter Society $55^{th}$ Annual Forum, Montreal, Canada, pp. 1-19.

Kamath et al., T.P.M. (2002) A Bayesian approach to a dynamic inventory model under an unknown demand distribution. Computers & Operations Research, v. 29, pp. 403-422.

Hirschleifer (1980) Price Theory and Applications. Prentice-Hall: New York, pp. 126-151.

Morris (1992) Market Oriented Pricing. Quarom Books: New York, pp. 172-173.

Evans and Berman (1992). Marketing. Macmillan: New York. Chapter 18: Overview of Price Planning, pp. 526-547.

Berry et al., Automobile Prices in Market Equilibria. Econometrica, vol. 63, No. 4 (Jul. 1995), pp. 841-890.

Monroe, (1978) Models for Pricing Decisions, *Journal of Marketing Research*, vol. XV (August), pp. 413-428.

Urban et al., (1968) A New Product Analysis and Decision Model, *Management Science*, vol. 14, No. 8 (April), pp. B490-B519.

Yang et al. (2003) Bayesian Analysis of Simultaneous Demand and Supply, Quantitative Marketing and Economics, vol. 1, pp. 251-275.

Largent, "A probabilistic risk management based process for planning and management of technology development", PhD Dissertation Georgia Tech Aerospace Engineering, Mar. 2003, downloaded Sep. 3, 208 [retrieved from http://smartech.gatech.edu/handle/1853/12168], pp. 1-79, 210-271.

Cortazar et al., "Monte Carlo Evaluation Model of an Undeveloped Oil Field", *Journal of Energy Finance & Development*, vol. 3, No. 1, pp. 73-84. Available online Jan. 13, 1998. ISSN: 1085-743.

Charnes, John M., "Using Simulation for Option Pricing", The University of Kansas School of Business, Dec. 13, 2000, Presented at 2000 Winter Simulation Conference, Dec. 10-13, 2000, Wyndham Palace Resort and Spa, Orlando, FL, www.wintersim.org, pp. 151-157.

MacMillan, Fional, "Risk, Uncertainty and Investment Decision-Making in the Upstream Oil and Gas Industry", MA Hons (University of Aberdeen), Oct. 2000, A thesis presented for the degree of Ph.D. at the University of Aberdeen.

Longstaff, et al., "Valuing American Options by Simulation: A Simple Least-Squares Approach", Anderson Graduate School of Management, eScholarship Repository, University of California, http://repositories.cdlib.org/anderson/fin/1-01, 2001.

Breeden et al., "Prices of State Contingent Claims Implicit in Options Prices", *Journal of Business*, vol. 51, No. 4, pp. 621-651 (Oct. 1978).

* cited by examiner

SYSTEMS, METHODS AND COMPUTER PROGRAM PRODUCTS FOR MODELING UNCERTAIN FUTURE DEMAND, SUPPLY AND ASSOCIATED PROFITABILITY OF A GOOD

CROSS-REFERENCE TO RELATED APPLICATIONS

The present application is a continuation-in-part of U.S. patent application Ser. No. 10/453,396, entitled: Systems, Methods and Computer Program Products for Modeling Uncertain Future Benefits, filed on Jun. 3, 2003 and published on Dec. 9, 2004 as U.S. Patent Application Publication No. 2004/0249642; and U.S. patent application Ser. No. 10/453,727, entitled: Systems, Methods and Computer Program Products for Modeling Demand, Supply and Associated Profitability of a Good, filed on Jun. 3, 2003 now U.S. Pat. No. 7,627,495 and published on Dec. 9, 2004 as U.S. Patent Application Publication No. 2004/0249696, the contents of both of which are incorporated by reference.

FIELD OF THE INVENTION

The present invention relates generally to systems, methods and computer program products for modeling future demand of a good and, more particularly, to systems, methods and computer program products for modeling the future demand, supply and associated profitability of a good over time where the demand, supply and/or associated profitability are subject to uncertainty.

BACKGROUND OF THE INVENTION

In classical economics, supply and demand have traditionally been examined by economists to explain how markets generate the price and quantity of a traded good. Generally, markets are seen to generate the price and quantity of a traded good by correlating the amount of a given good that manufacturers anticipate selling at a given price (i.e., supply) with the amount of that good that consumers are willing to purchase (i.e., demand). Supply refers to the varying amounts of a certain good that manufactures will supply at different prices. Because, in general, a higher price yields a greater supply, supply is often illustrated by an upward-sloping curve on a graph of price versus quantity during a specified time period. Demand, on the other hand, refers to the quantity of a good that is demanded by consumers at any given price. Because demand generally decreases as price increases, demand is often illustrated by a downward-sloping curve on a graph of price versus quantity for a specified time period.

To manufacturers, modeling demand and supply can be useful tools that can aid in modeling the profitability of a given good. Traditionally, manufacturers have not been capable of reliably quantifying a forecast of future demand, supply and thus profitability for projects when a significant amount of uncertainty exists. Whereas conventional techniques for modeling demand, supply and profitability provide adequate models, they have shortcomings in certain, but crucial, applications. For example, such techniques are typically unable to easily incorporate changes in uncertainty over time. Also, for example, such techniques are typically unable to easily account for contingent decisions that may occur during a given time period.

SUMMARY OF THE INVENTION

The present invention provides systems, methods and computer program products for modeling uncertain future demand, supply and associated profitability of a good over a period of time, where the future demand, supply and/or profitability are subject to an amount of growth and/or uncertainty that can vary. The systems, methods and computer program products of the present invention advantageously are capable of modeling uncertain future demand, supply and associated profitability based on sparse historical data or estimates regarding present and future price and quantity of the good. Also, the present invention is capable of modeling the demand, supply and profitability as a function of the size of the market within which the good is sold over each segment of the period of time, where the respective measures are modeled in an improved manner when compared to conventional techniques. Additionally, the systems, methods and computer program products model the demand, supply and associated profitability while better accounting for variability in the relationship of the price of the good and the number of units of the good purchased.

By accounting for variability in the relationship of the price of the good and the number of units of the good purchased for each time segment, embodiments of the present invention are capable of modeling demand, supply and associated profitability over time while accounting for uncertainty in the price of the good and the number of units of the good purchased over each segment of the period of time. Such modeling is advantageous in a number of different contexts, such as in the context of commercial transactions. Programs for the future sale of goods inherently have associated uncertainty, particularly as it relates to the market for the goods, typically defined by the number of goods purchased and the price for each unit. According to embodiments of the present invention, then, demand, supply and associated profitability of a good can be modeled in a manner that facilitates deriving an understanding about a future market that is uncertain, particularly when data regarding price and number of units of the good purchased are sparse.

According to one aspect of the present invention, a method is provided that includes modeling future demand and/or future supply for a good at one or more time segments of a period of time. In accordance with the method, future demand/supply at a respective time segment is modeled based upon a price sensitivity distribution of a unit purchase of the good during the respective time segment. In addition, future demand/supply is modeled based upon a market potential distribution of a number of units of the good in a market associated with the good during the respective time segment. The price sensitivity distribution and/or the market potential distribution for a respective time segment is based upon a growth rate and an uncertainty for the respective time segment.

The method can further include forecasting a market for a respective time segment by randomly selecting a predefined number of units of the good based upon the market potential distribution for the respective time segment. The market can be forecast before modeling the demand and/or supply for the respective time segment. Then, the demand and/or supply at the respective time segment can be modeled based upon the price sensitivity distribution and the forecasted market for the respective time segment.

The price sensitivity distribution for a respective time segment can be determined by determining the price sensitivity distribution of a unit purchase at a predetermined price over the respective time segment, and thereafter recasting the price sensitivity distribution. More particularly, the price sensitivity distribution can be determined based upon a mean purchase price and an associated standard deviation for the respective time segment. The price sensitivity distribution can then be recast in a reverse cumulative format when modeling demand, and otherwise recast in a cumulative format when modeling supply.

In addition to modeling demand, the method can also include modeling cost, as well as profitability, of the good at a respective time segment. In such instances, the cost for a time segment can be modeled by modeling an average cost per unit for the different numbers of units. Profitability at the respective time segment can then be modeled based upon the demand model and the cost model for the respective time segment. More particularly, the profitability for a time segment can be modeled by subtracting the average cost per unit for the different numbers of units from the prices per unit for the respective different numbers of units.

Before determining the price sensitivity and market potential distributions, a growth rate can be determined for the respective time segment. Advantageously, the growth rate for a respective time segment can be defined such that the growth rate for at least one time segment differs from the growth rate of at least one other time segment. In addition to defining the growth rate, an uncertainty associated with the benefit can be determined for the respective time segment. Like the growth rate, the uncertainty for the respective time segment can advantageously be defined such that the uncertainty for at least one time segment differs from the uncertainty of at least one other time segment. Further, a growth rate for a respective time segment can be defined independent of an uncertainty for the respective time segment, and vice versa.

Demand and/or supply, such as future demand and/or supply at a respective time segment, can be more particularly modeled for a good in a non-differentiated market and/or a differentiated market. In one embodiment, for example, demand and/or supply for a good in a differentiated market is modeled by first modeling demand and/or supply for a good in a non-differentiated market based upon a price sensitivity distribution and a market potential distribution. Thereafter, the model of demand and/or supply in the non-differentiated market is integrated to thereby model demand and/or supply for a good in a differentiated market.

A market can be forecast based upon the market potential distribution, after which the forecast market is segmented into a plurality of market segments. At least some of the market segments can be selected and, for those selected market segments, a price per unit can be calculated. For example, the market segments can represent successive percentages of the forecasted market, and have associated prices per unit in the non-differentiated market model of demand and/or supply. In such instances, a price per unit for a selected market segment can be calculated by calculating an average price per unit of the market segments representing no less than the percentage of the forecasted market represented by the selected market segment. Also in such instances, the average price per unit is calculated from the respective prices per unit in the non-differentiated market model of at least one of demand or supply. Irrespective of how the price per unit for at least some of the market segments is calculated, demand and/or supply can then be modeled based upon those market segments and the respective prices per unit.

Further, demand and/or supply, such as future demand and/or supply at a respective time segment, can be modeled for an aggregate market formed of a plurality of independent component markets for a good. In such instances, each component market can be defined by a respective price sensitivity distribution and market potential distribution. The demand and/or supply in the aggregate market can thus be modeled based upon the price sensitivity distributions and market potential distributions of the component markets. More particularly, for example, demand and/or supply for the good in the component markets can be modeled based upon respective price sensitivity distributions and market potential distributions.

After modeling demand and/or supply for the good in the component markets, those models of demand and/or supply can be combined to thereby model demand and/or supply for the good in the aggregate market. For example, the component market models of demand and/or supply can each include a plurality of market segments having associated prices per unit. The component market models can then be combined by ranking the price per unit of each market segment across the component markets in a descending order (or ascending order). Then, a cumulative number of units for each different price per unit can be calculated, the cumulative number of units for each different price per unit equaling the cumulative number of units having a price per unit no less than the respective price per unit when the prices per unit are ranked in descending order (or the cumulative number of units having a price per unit less than the respective price per unit when the prices per unit are ranked in ascending order). The demand and/or supply for the good in the aggregate market can then be modeled based upon the different prices per unit and respective cumulative number of units.

Systems and computer program products are also provided in accordance with other aspects of the present invention. Embodiments of the present invention therefore are capable of facilitating an understanding about demand and/or supply for a good in an uncertain future market, where demand and/or supply can be defined based upon the number of units of a good purchased for a price per unit. Advantageously, the systems, methods and computer program products are capable of modeling the demand, supply and associated profitability over a period of time based on sparse historical data or estimates regarding price and quantity of the good. Also, by incorporating the unknown size of the market at each time segment of the period of time, and by selecting a forecasted market according to the Monte Carlo method, the present invention is capable of modeling the demand, supply and, thus the profitability, as a function of the size of the market within which the good is sold over the respective segment more adequately than conventional methods of modeling the demand and supply. Additionally, by including a price sensitivity distribution, the systems, methods and computer program products model demand, supply and associated profitability while better accounting for how changing the price of the good changes the number of units of the good purchased over each of a number of time segments of the period of time. As such, the system, method and computer program product of embodiments of the present invention solve the problems identified by prior techniques and provide additional advantages.

BRIEF DESCRIPTION OF THE DRAWINGS

Figure 1:
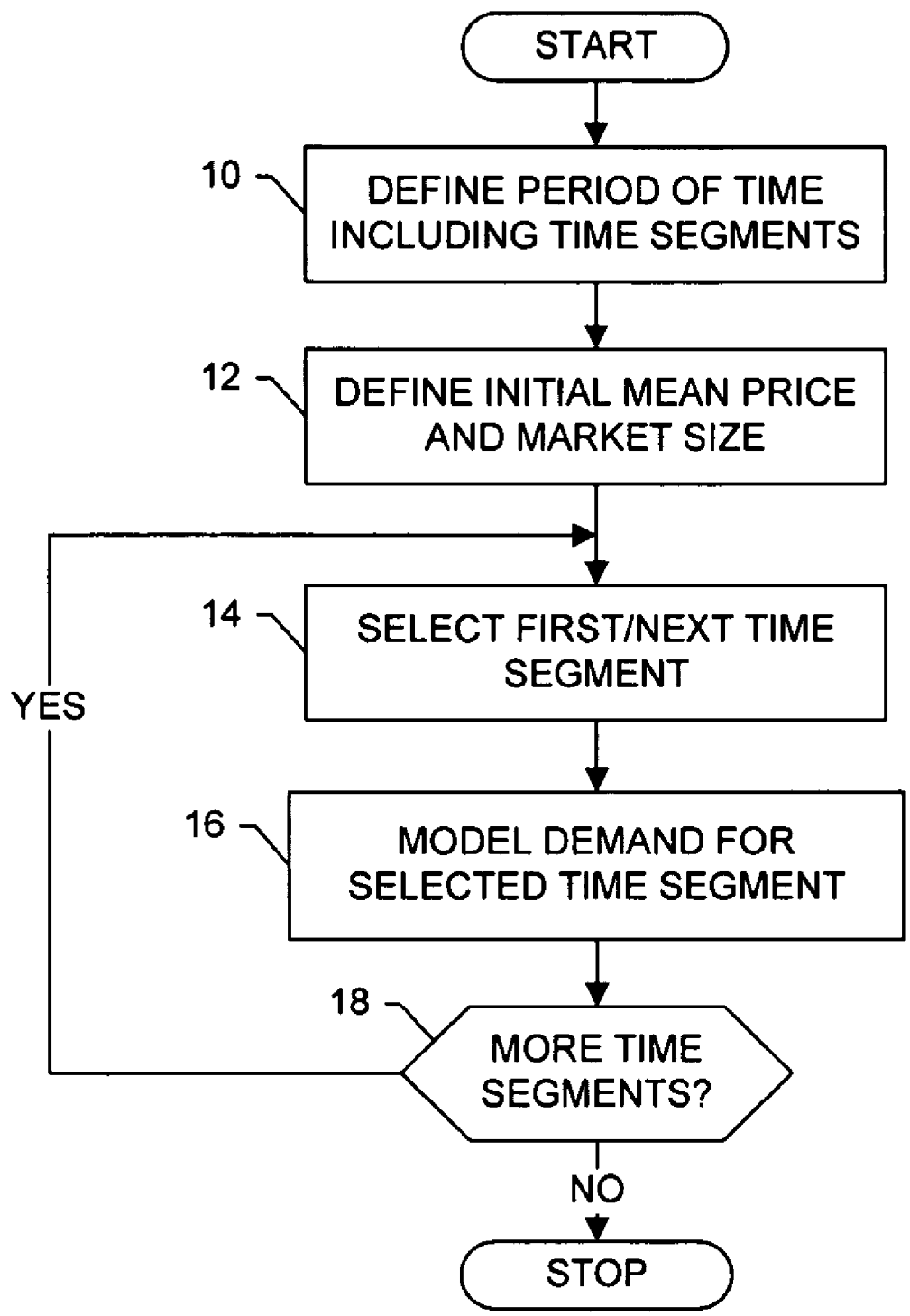
Figure 2:
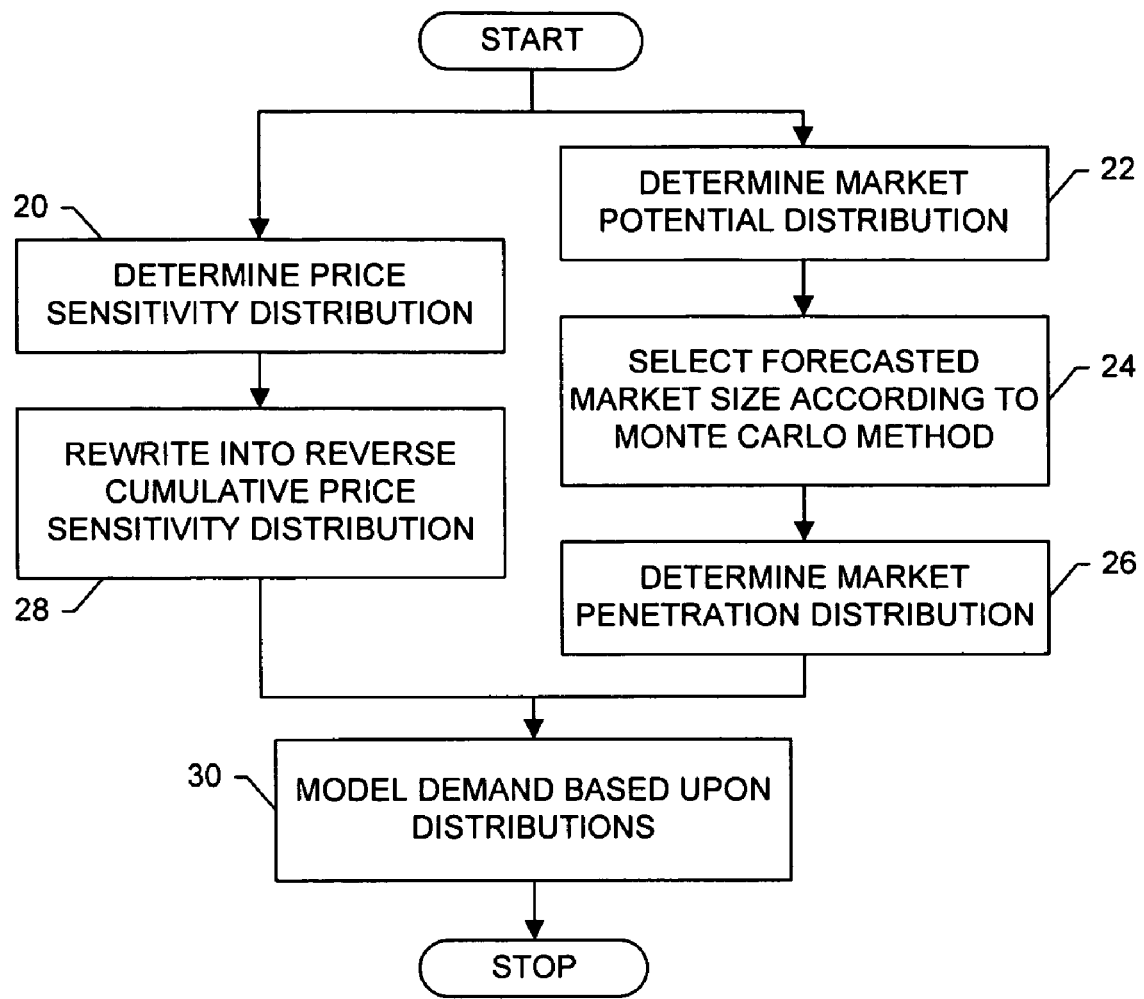
Figure 3:
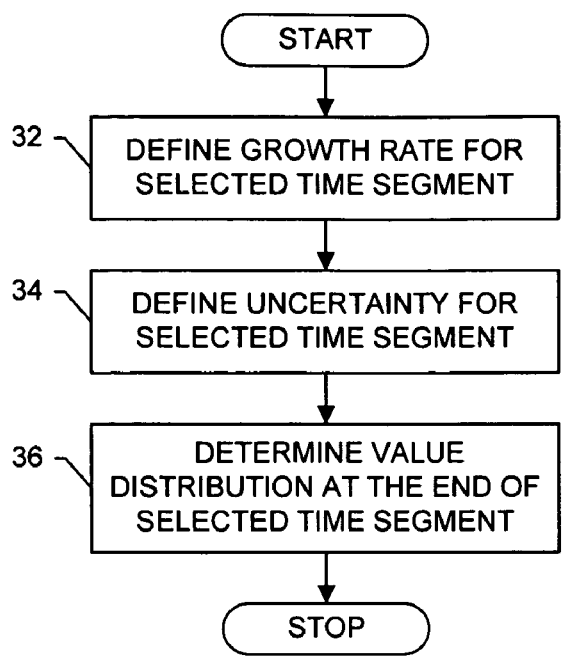
Figure 4:
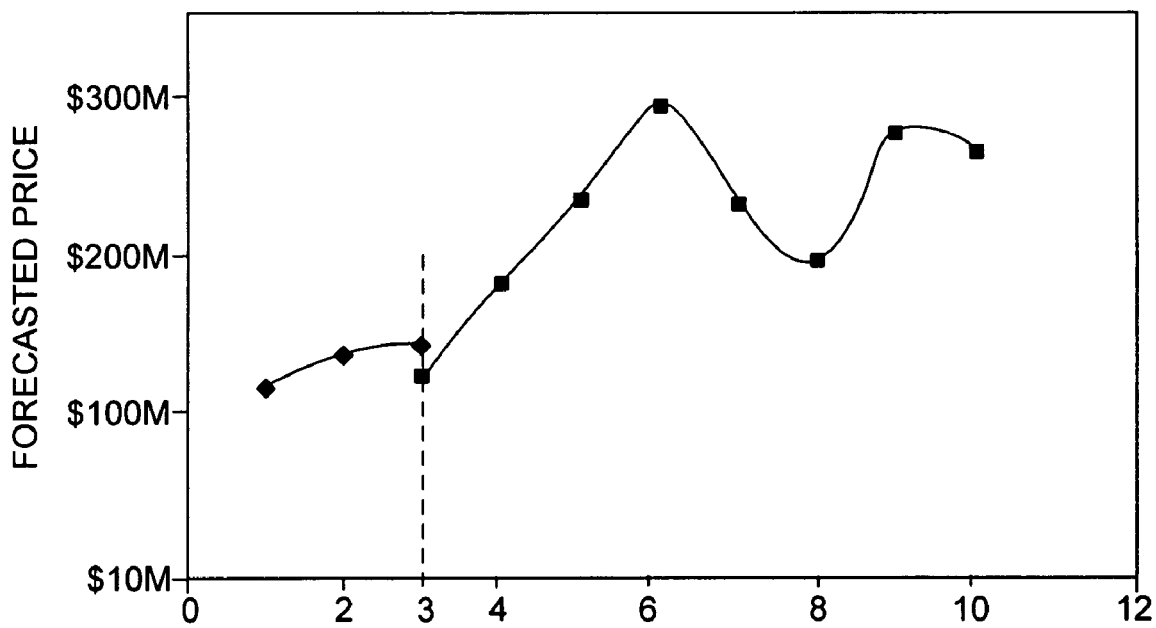
Figure 5:
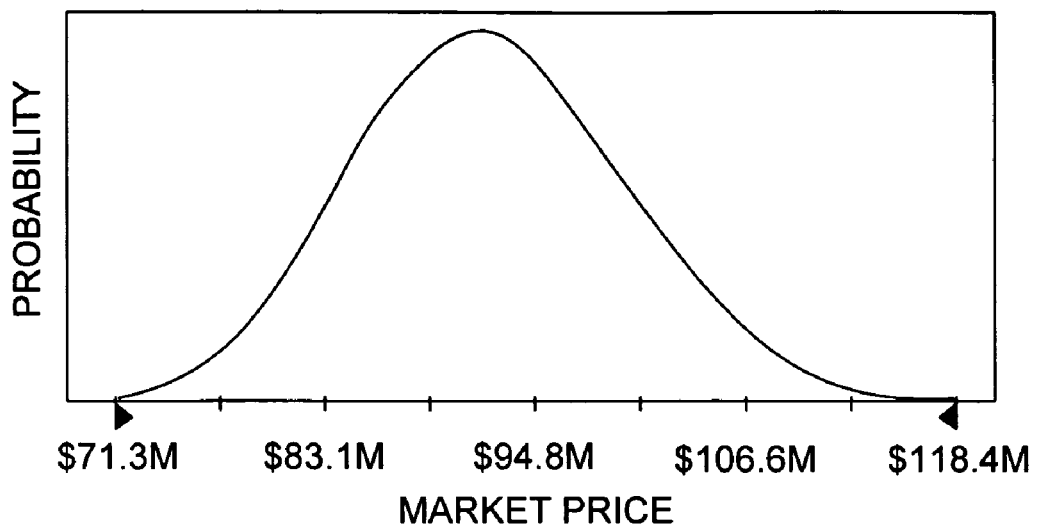
Figure 6:
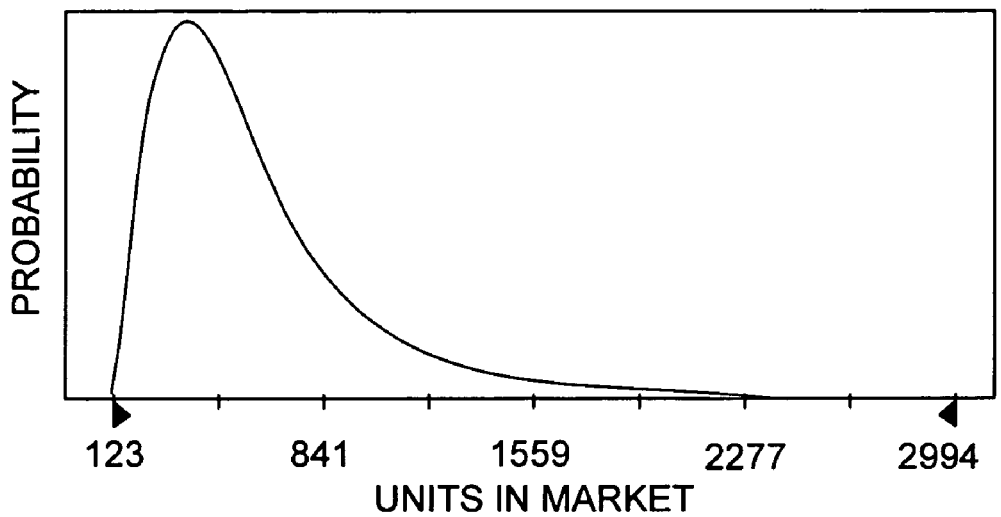
Figure 7:
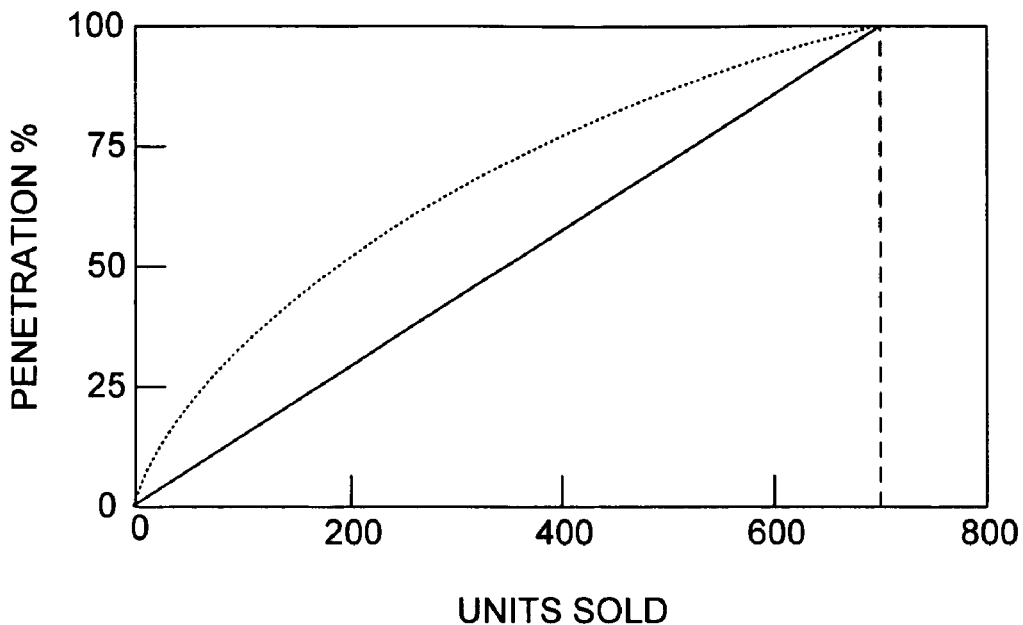
Figure 8A:
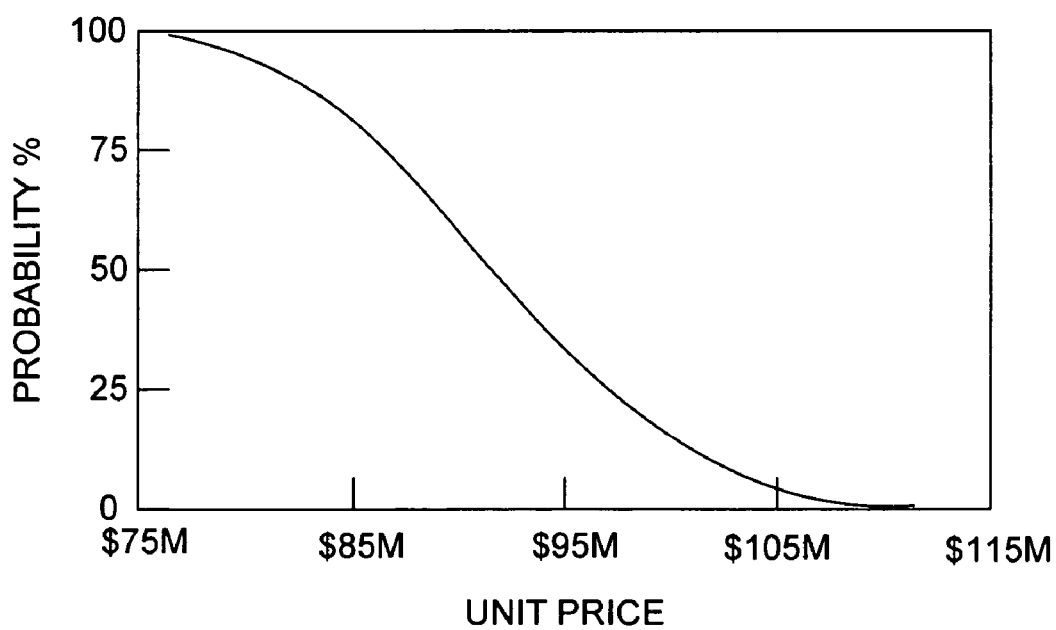
Figure 8B:
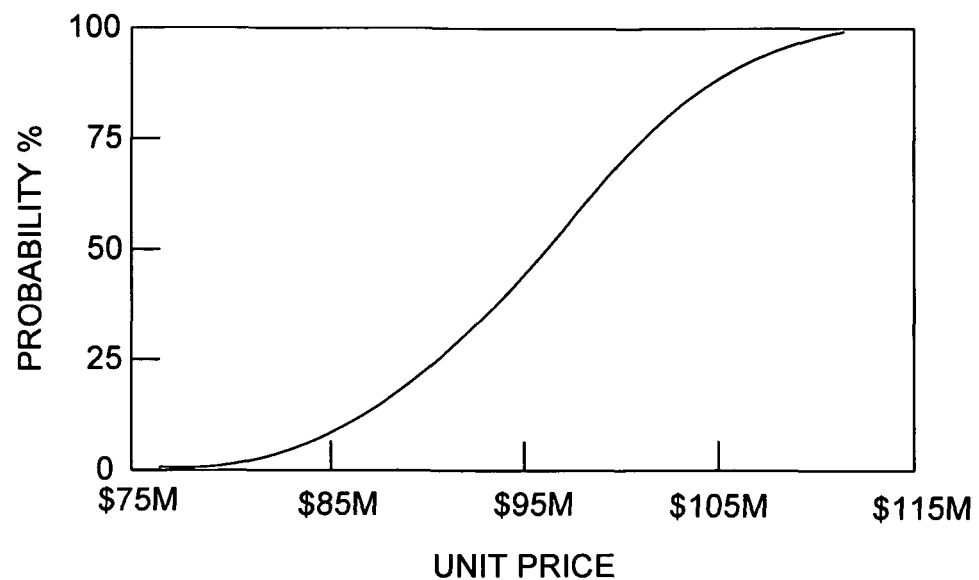
Figure 9A:
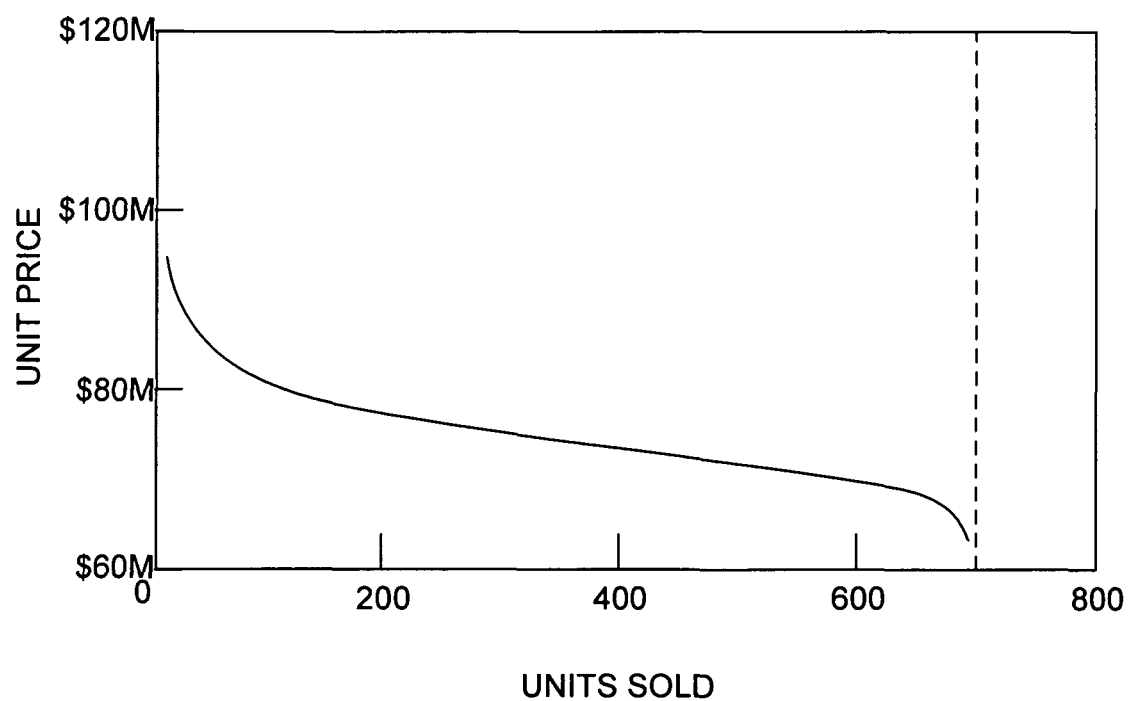
Figure 9B:
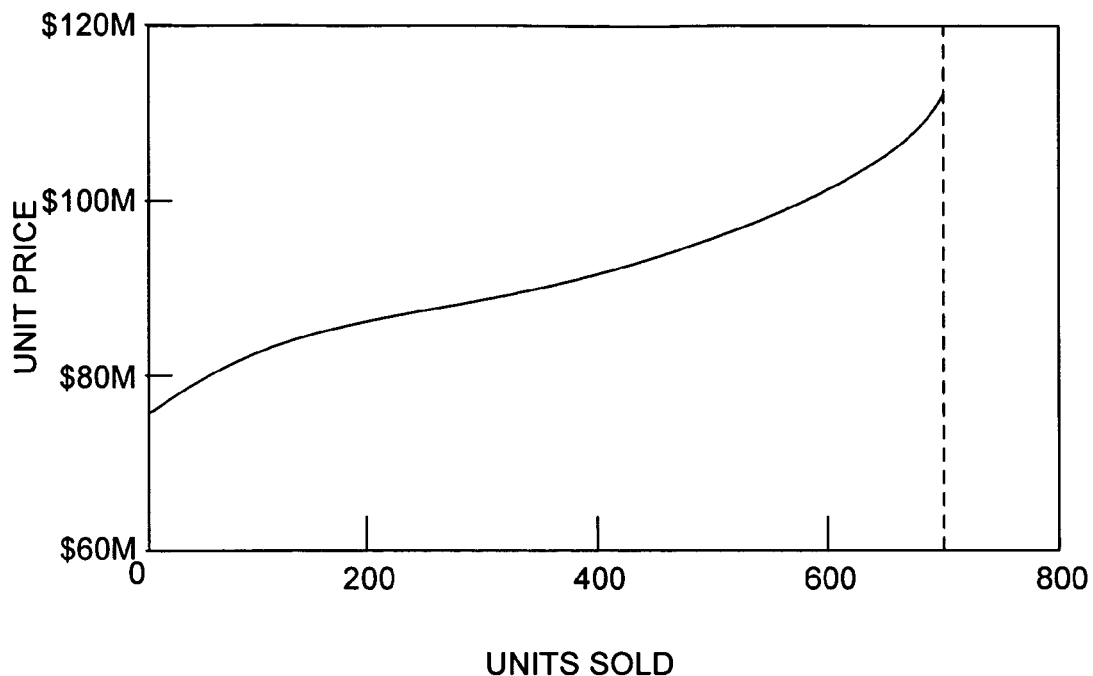
Figure 16:
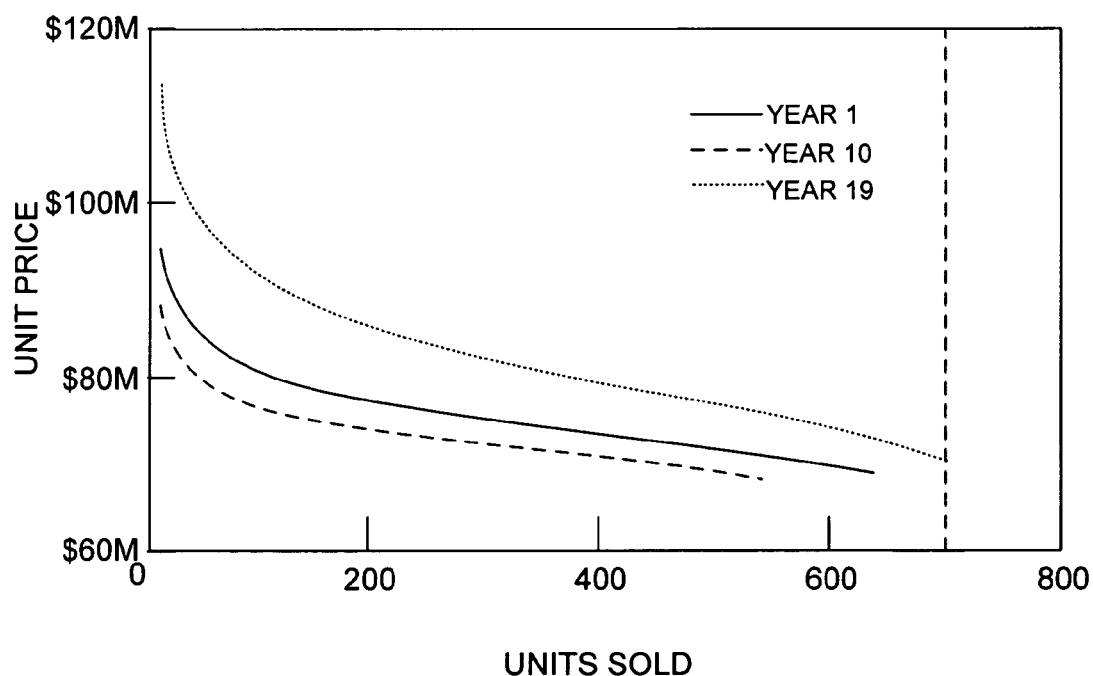
Figure 10:
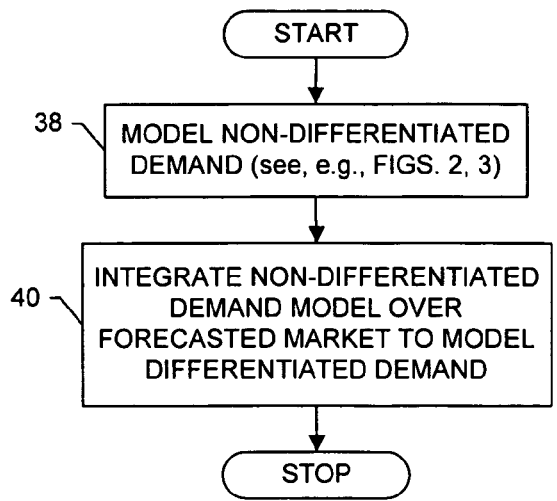
Figure 11:
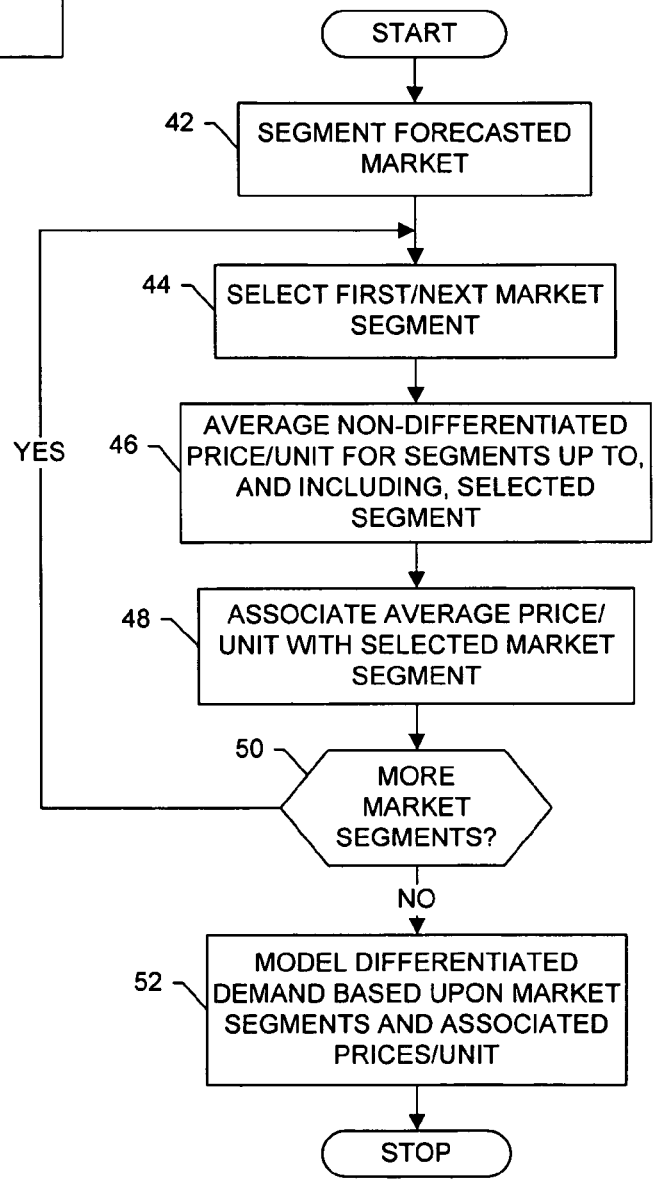
Figure 12A:
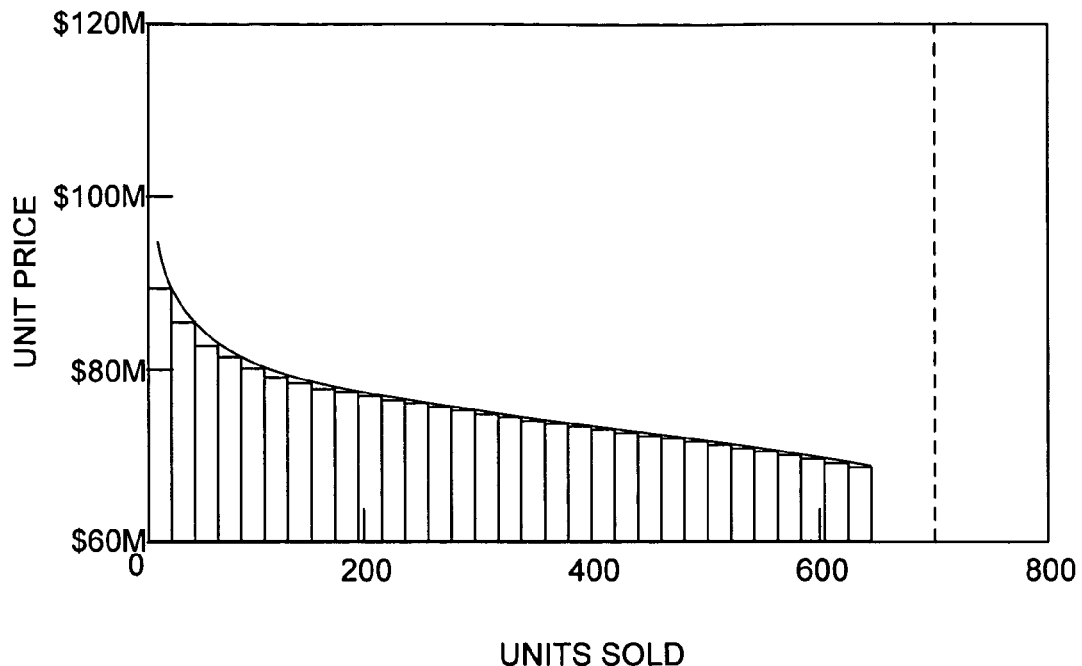
Figure 12B:
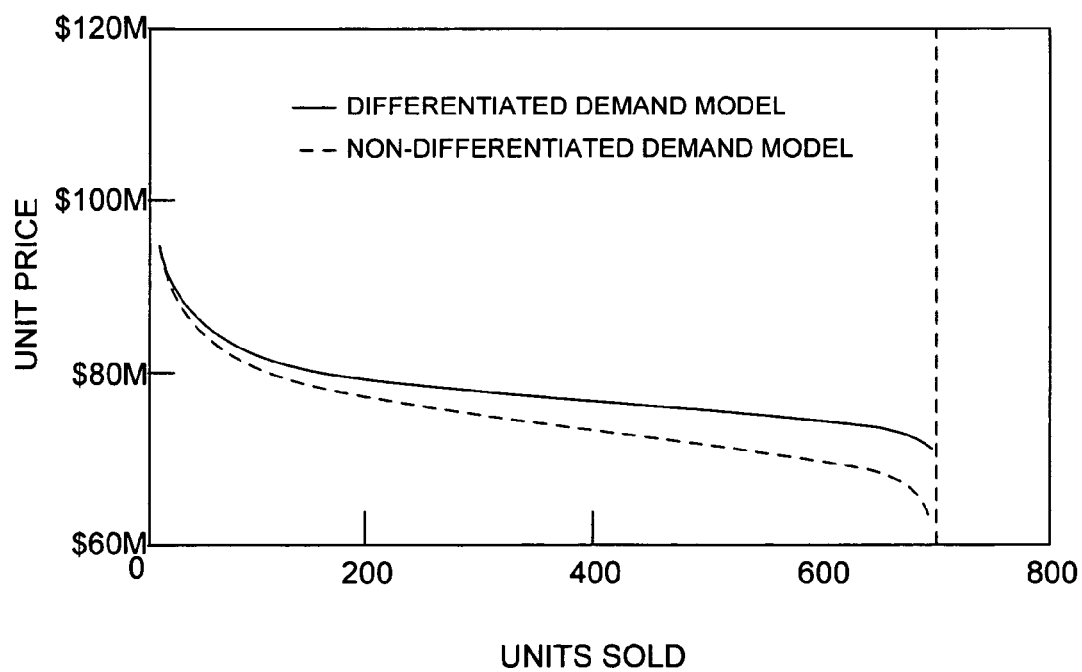
Figure 13A:
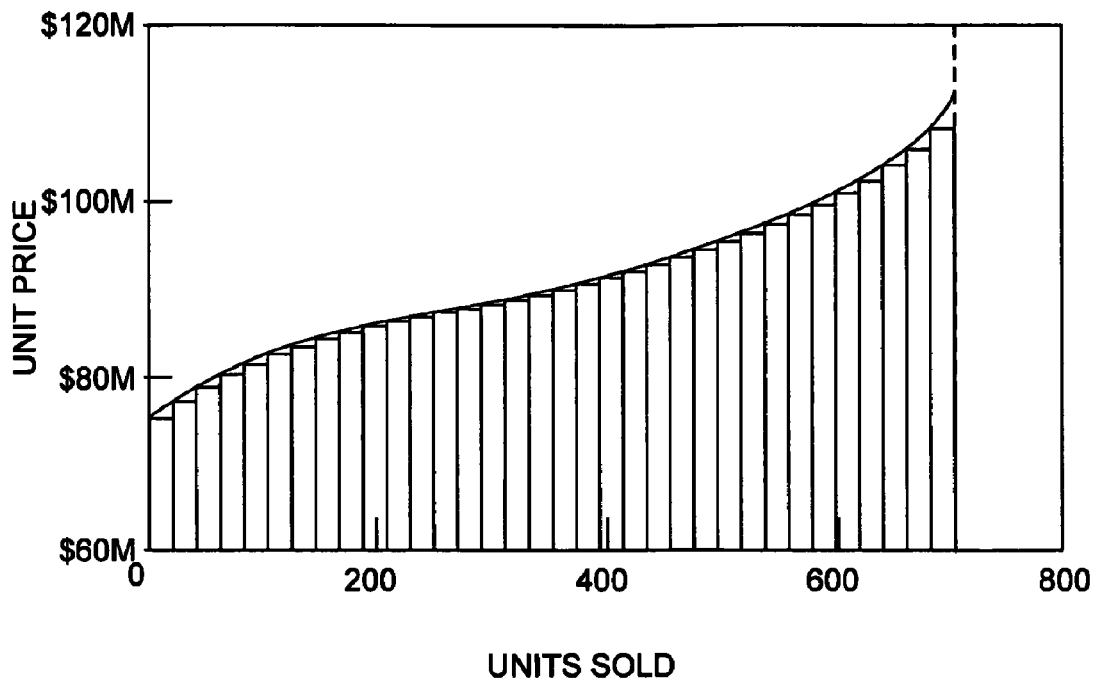
Figure 13B:
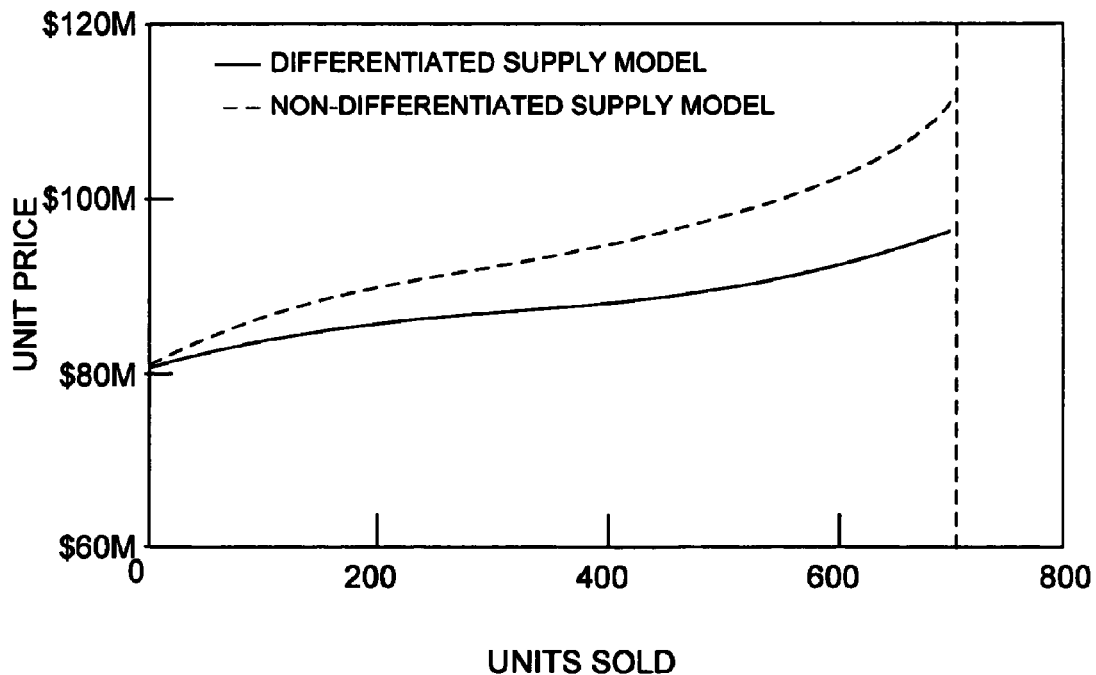
Figure 14:
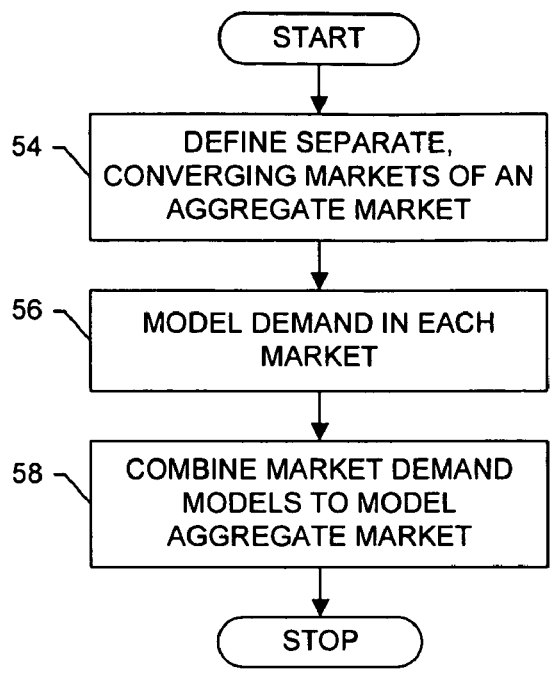
Figure 15:
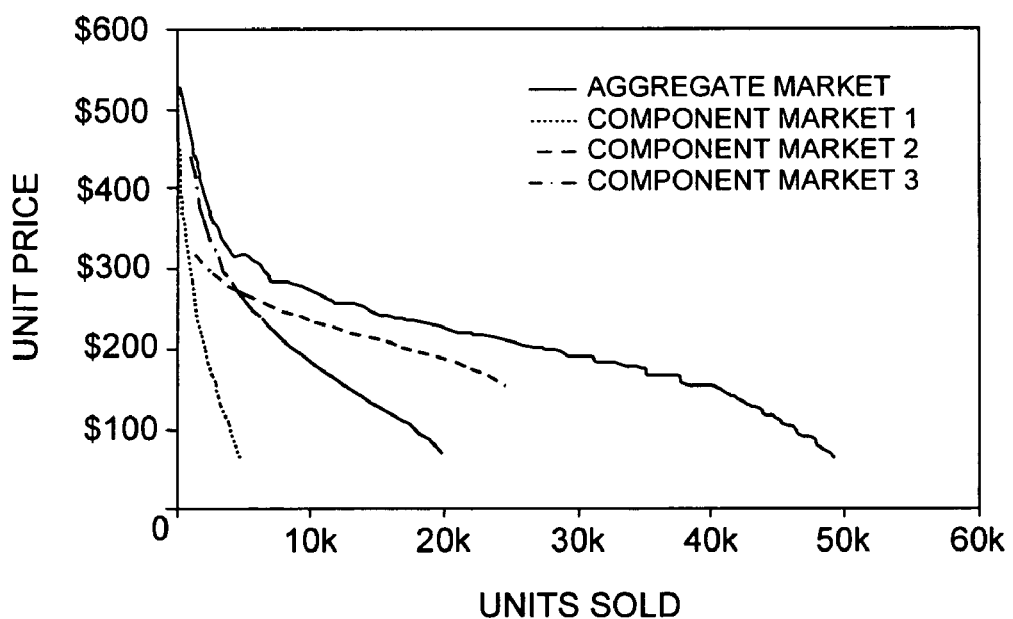
Figure 17:
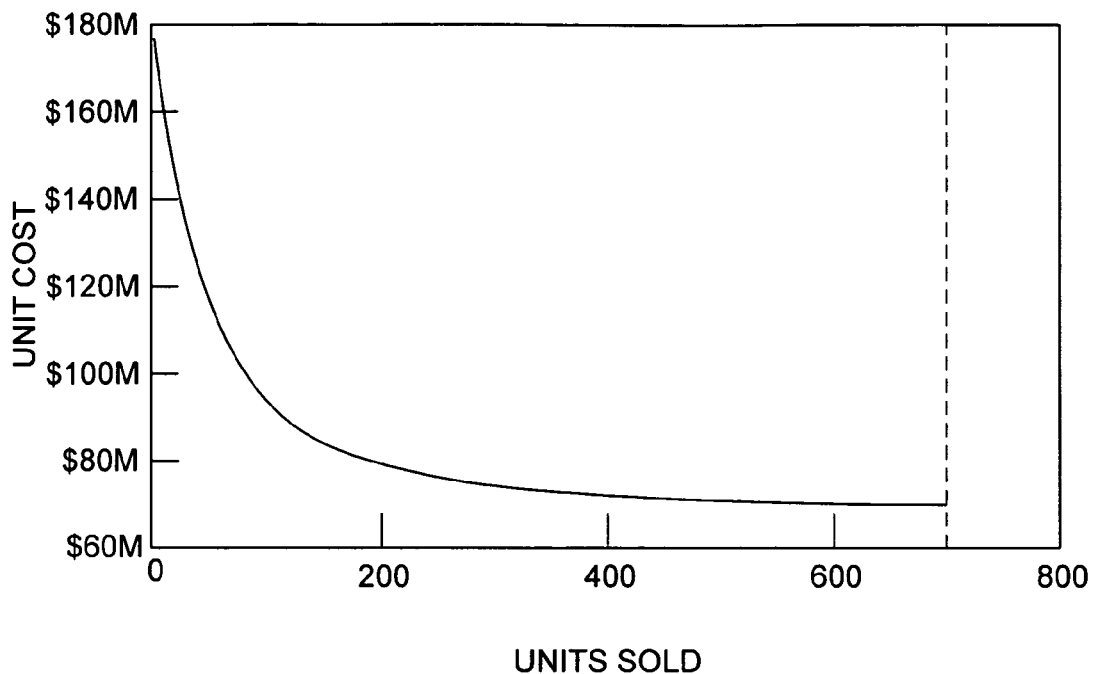
Figure 18:
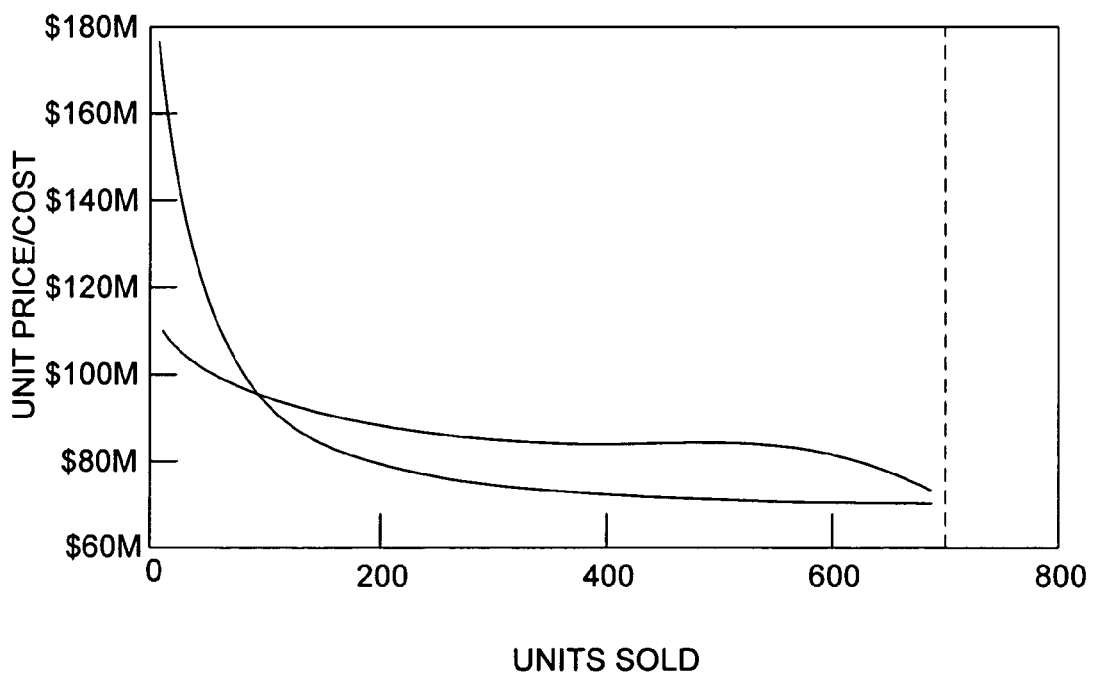
Figure 19:
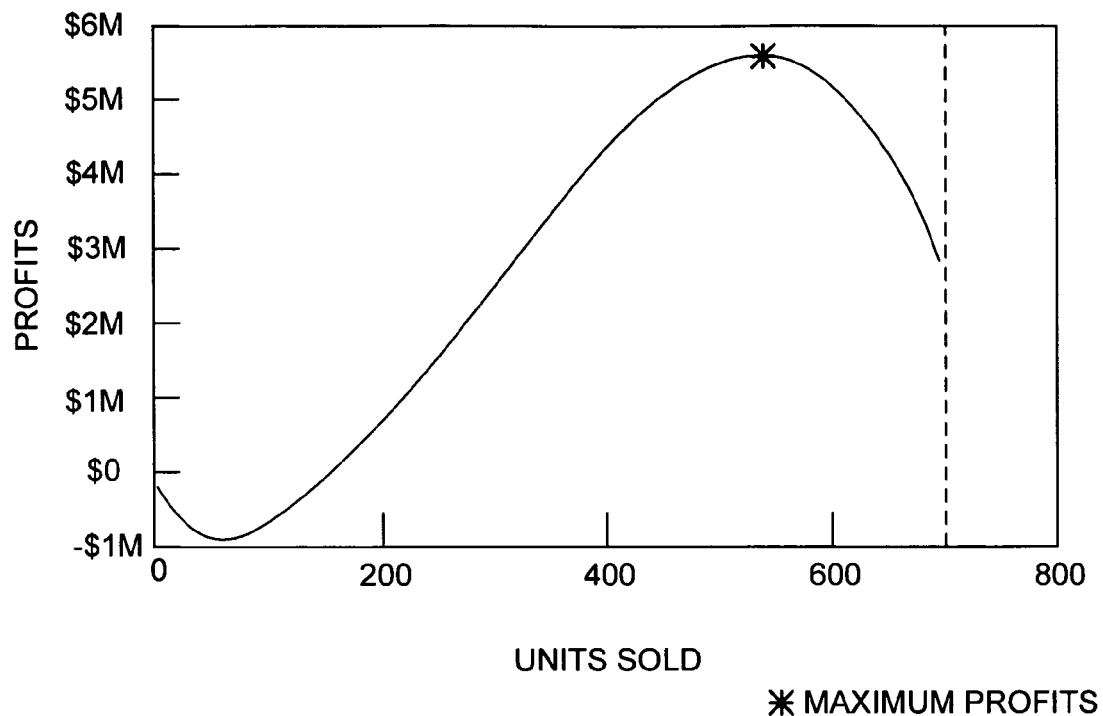
Figure 20:
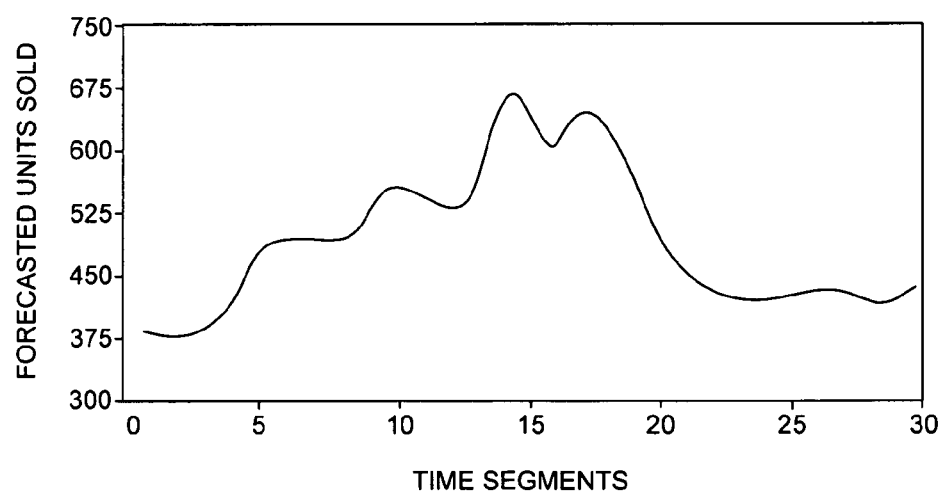
Figure 21:
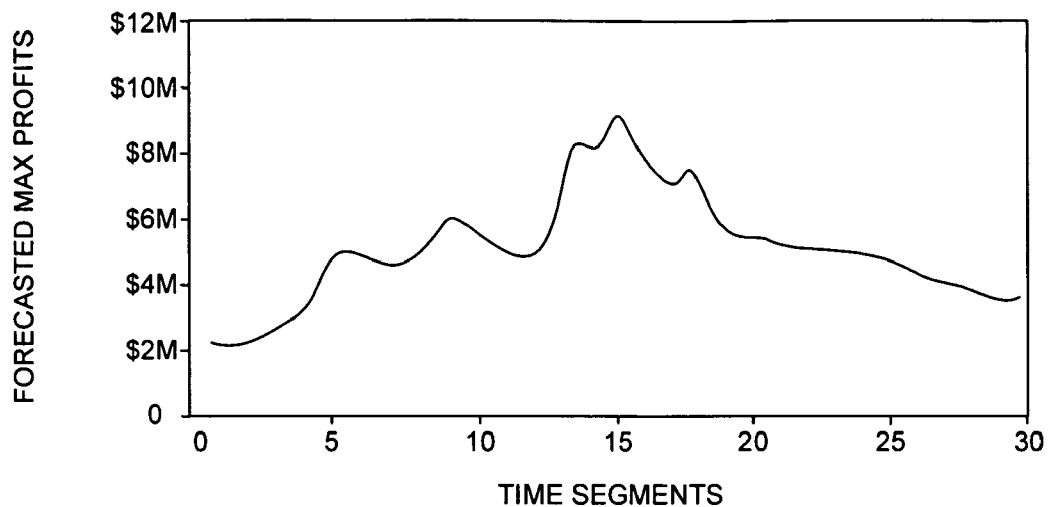
Figure 22:
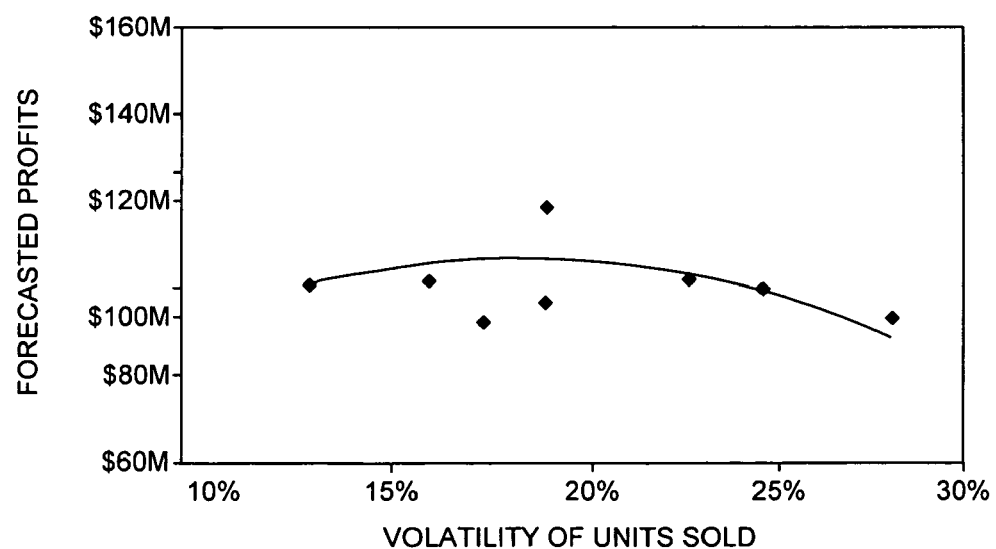
Figure 23:
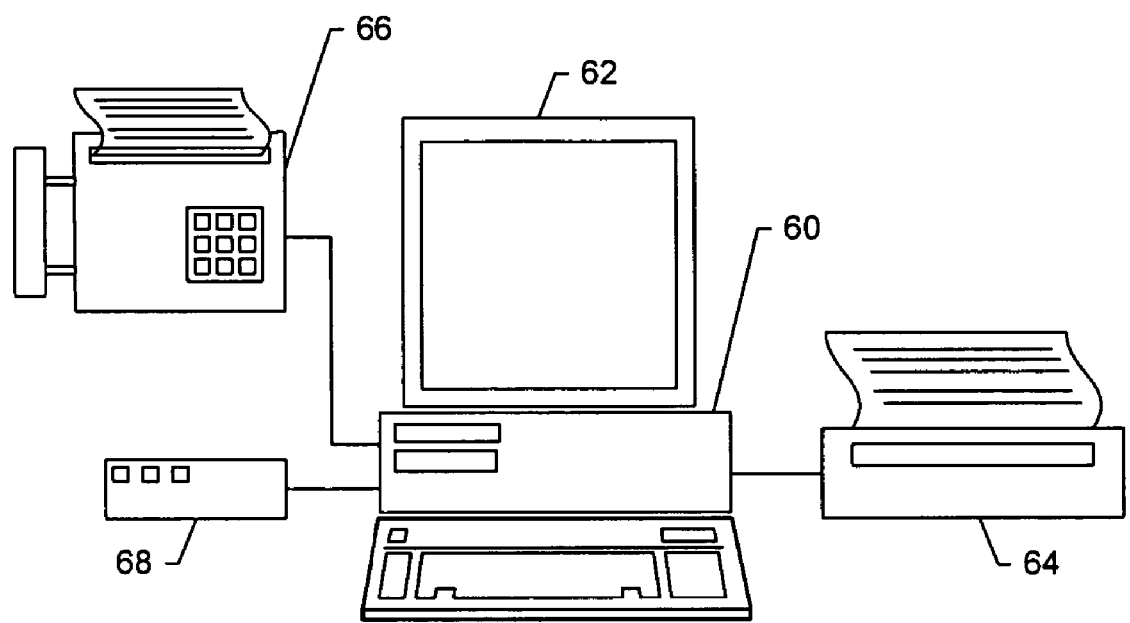

Having thus described the invention in general terms, reference will now be made to the accompanying drawings, which are not necessarily drawn to scale, and wherein:

FIG. 1 is a flowchart illustrating various steps in a method of modeling uncertain future demand over a period of time including a plurality of time segments, in accordance with one embodiment of the present invention;

FIGS. 2 and 3 are flowcharts illustrating various steps in a method of modeling demand over a time segment in a non-differentiated market, in accordance with one embodiment of the present invention;

FIG. 4 is a graphical illustration of future price of a good being subject to a contingent activity;

FIG. 5 is a graph of a price sensitivity distribution used during operation of the system, method and computer program product of one embodiment of the present invention;

FIG. 6 is a graph of a market potential distribution used during operation of the system, method and computer program product of one embodiment of the present invention;

FIG. 7 is a schematic illustration of a market penetration distribution for a forecasted market used during operation of the system, method and computer program product of one embodiment of the present invention;

FIG. 8a is a schematic illustration of a price sensitivity distribution recast in reverse cumulative format used during operation of the system, method and computer program product for modeling demand according to one embodiment of the present invention;

FIG. 8b is a schematic illustration of a price sensitivity distribution recast in cumulative format used during operation of the system, method and computer program product for modeling supply according to one embodiment of the present invention;

FIG. 9a is a schematic illustration of a demand curve in a forecasted market for one time segment in a non-differentiated market, according to one embodiment of the present invention;

FIG. 9b is a schematic illustration of a supply curve in a forecasted market for one segment of a time period including a plurality of segments, according to one embodiment of the present invention;

FIGS. 10 and 11 are flowcharts illustrating various steps in a method of modeling demand over a time segment in a differentiated market, in accordance with one embodiment of the present invention;

FIG. 12a is a schematic illustration of a non-differentiated demand curve segmented into a plurality of market segments, in accordance with one embodiment of the present invention;

FIG. 12b is a schematic illustration of a demand curve in a forecasted market for one time segment in a differentiated market and in a non-differentiated market, according to one embodiment of the present invention;

FIG. 13a is a schematic illustration of a non-differentiated supply curve segmented into a plurality of market segments, in accordance with one embodiment of the present invention;

FIG. 13b is a schematic illustration of a supply curve in a forecasted market for one time segment in a differentiated market of the present invention;

FIG. 14 is a flowchart illustrating various steps in a method of modeling demand over a time segment in an aggregate market including a plurality of component markets, in accordance with one embodiment of the present invention;

FIG. 15 is a schematic illustration of demand curves in three forecasted component markets, as well as in a corresponding aggregate market, according to one embodiment of the present invention;

FIG. 16 is a schematic illustration of a demand curve in a forecasted market for three segments of a time period including a plurality of segments, according to one embodiment of the present invention;

FIG. 17 is a schematic illustration of a cost curve used during operation of the system, method and computer program product of one aspect of the present invention in the context of a good purchased in a non-differentiated market;

FIG. 18 is a schematic illustration comparing a demand curve with a cost curve, both modeled in accordance with embodiments of the present invention;

FIG. 19 is a schematic illustration of a profitability curve according to one embodiment of the present invention;

FIG. 20 is a schematic illustration of an optimum number of units of a good sold over a period of time, according to one embodiment of the present invention;

FIG. 21 is a schematic illustration of a maximum profit for a good over a period of time, according to one embodiment of the present invention;

FIG. 22 is a schematic illustration of the maximum profit for a good compared against the volatility (uncertainty) in the number of units of the good sold, according to one embodiment of the present invention; and FIG. 23 is a schematic block diagram of the system of one embodiment of the present invention embodied by a computer.

DETAILED DESCRIPTION OF THE INVENTION

The present invention now will be described more fully with reference to the accompanying drawings, in which some, but not all embodiments of the invention are shown. This invention may be embodied in many different forms and should not be construed as limited to the embodiments set forth; rather, these embodiments are provided so that this disclosure will be thorough and complete, and will fully convey the scope of the invention to those skilled in the art. Like numbers refer to like elements throughout.

I. Modeling Demand and/or Supply for a Good

According to one aspect of the present invention, systems, methods and computer program products are provided for modeling demand and/or supply for a good. The description will explain modeling demand for goods. Except where indicated, the following description applies equally to modeling supply for goods. Thus, referring to FIG. 1, modeling uncertain future demand for a good generally begins by defining the period of time, as shown in block 10. The period of time can begin at t=0 and extend to t=T. The period of time can then be divided into a number of different time segments. In one embodiment, the time period T is defined so that each such time segment can be represented as an integer divisor of T, e.g., t=0, 1, 2, . . . T−1. Thus, for example, the period of time can be defined as a number of years (i.e., T=30), where the period of time is divided into a number of one-year time segments (e.g., t=0, 1, 2, . . . 29). Each time segment begins at point in time t and ends at point in time t+1 (presuming the time segment is an integer divisor of T), and is defined by the beginning point in time t. Thus, time segment t=1 extends from point in time t=1 to point in time t=2. Similarly, time segment t=2 extends from points t=2 to t=3.

Either before, during or after defining the time period, the mean price and mean market size (number of units) of the good is defined for time segment t=0, as shown in block 12. The mean price and mean market size can be determined in any of a number of different manners such as, for example, based upon historical data, estimates or the like. Also, after defining the time period, a time segment can be selected over which to model demand for the good, typically beginning with the time segment t=1, as shown in block 14.

After selecting a time segment, the uncertain demand over the selected time segment is modeled, as shown in block 16. Products can generally be categorized in either a non-differentiated market or a differentiated market. In a non-differentiated market, such as a commodity market, goods are offered at one standard price, like $1.39 per pound or a listed price of $100 M per item. In a differentiated market, the prices of the goods differ on a sale-by-sale or transaction-by-transaction basis because of differing perceived values. For example, the storeowner might discount the last three pounds of tomatoes at $1.00 per pound in order to clear end-of-the-day perishable stock. In another example, the listed price of $100 M per item could be subjected to private negotiations resulting in a better match of the negotiated sale price to the marginal utility of the item to the consumer. As such, in a differentiated market, the value of the distinguishing features are revealed and determined during private negotiations between a supplier and a consumer. Because the negotiated prices remain private, the process allows different amounts of goods to be sold at different prices. For example, wholesale lots of automobiles and aircraft are both goods that, due to differing features, can be sold at differing prices for differing quantities. Another type of differentiated market is one where there are sophisticated pricing systems that exploit small differences among buyer preferences, for example airplane seat, travel and concert seat reservation systems, and department store merchandise pricing coupled with membership discounting.

In a non-differentiated market, all goods are typically sold and purchased according to a single price for each unit of the good. In a differentiated market, however, the goods can vary in price. Goods in a differentiated market are typically sold according to contracts for a predetermined number of units of the good at a predetermined price for each unit. As such, the present invention provides systems, methods and computer program products for modeling demand for goods in a non-differentiated market as well as a differentiated market.

A. Goods in Non-Differentiated Markets

The demand for a good in a non-differentiated market is generally a function of the price per unit of the good and the size of the market in terms of the total number of units of the good in the market, both of which differ depending upon the good. In modeling the demand for some subsequent time in the future, neither the price of the good nor the size of the market can be specified as each includes an amount of uncertainty. Thus, to most accurately model the demand for the good such that the uncertainty in the price per unit and/or the size of the market are captured, the demand is typically modeled based upon a distribution of the possible prices for which the good may be sold, and a distribution of the possible sizes of the market within which the good may be sold.

Referring now to FIG. 2 with respect to non-differentiated markets, modeling the uncertain future demand over the selected time segment (e.g., t=1) includes assessing uncertainty in the price per unit of the good by determining how the price of the good affects whether customers will purchase the good, or in the case of modeling supply, how the price of the good affects whether manufacturers will produce the good. Uncertainty in the purchase price of each unit of the good is typically expressed in a price sensitivity distribution (e.g., lognormal distribution) of a unit purchase of the good at a predetermined price, as shown in block 20. The price sensitivity distribution generally assigns a probability of a unit purchase to each respective price at which consumers would purchase the unit. Advantageously, the price sensitivity distribution can be developed from sparse data of real or hypothetical consumer purchases of at least one unit of the good at respective prices per unit developed according to any one of a number of different methods, such as from a number of historical sales, an expert's estimation, or a market survey. The distribution shown in FIG. 2 can be defined with as few as two points of price data, such as the price values 10% probability (only 10% of customers will purchase above a selected price) and 90% probability (90% of customers will purchase above a selected price). Additional data points, however, provide better accuracy of the price sensitivity distribution estimate.

The price sensitivity distribution for the selected time segment (e.g., t=1) can be determined in any of a number of different manners, such as in accordance with the method shown in FIG. 3. As illustrated in block 32 of FIG. 3, one method of determining a price sensitivity distribution or other value distribution includes defining the growth rate of the good for the selected time segment. The growth rate can be determined according to any of a number of different techniques, such as according to market forecasts. Advantageously, and in contrast to the price path formulation associated with the Black-Scholes method, the growth rate can vary from time segment to time segment over the time period. Thus, for example, the growth rate for time segment t=1 can equal 20%, while the growth rate for time segment t=2 can equal 20% or, alternatively, any value greater than or less than 20%.

Either during or after defining the growth rate, the uncertainty in the market including the good can be determined for the selected time segment (e.g., t=1), as shown in block 34. The uncertainty can be determined according to any of a number of different techniques. The price sensitivity distribution (value distribution) can then be determined based upon the standard deviation in time for the selected time segment and the mean market price of the good for the time segment. In one embodiment, for example, the uncertainty is determined based upon a statistical analysis of average growth rate or a particular market, versus change in growth rate, resulting in a standard deviation calculation for uncertainty.

More particularly, in one embodiment for example, the returns can be modeled from risk values and associated return, or growth values, as such may be determined by an estimator or the like. Then, assuming a typical linear relationship between risk and return, the risk can be modeled as a linear function of returns based upon the two risk values and associated return values. For example, according to one embodiment, two risk values may comprise 20% and 30%, with associated return values comprising 10.0% and 12.5%, respectively. With such values, risk can be modeled as a linear function of return as follows:

$$\text{Risk(Return)}=4\times(\text{Return}-5)$$

where return and risk are expressed as percentages. For a further description of modeling risk as a function of returns, see U.S. patent application Ser. No. 10/453,395, entitled: Systems, Methods and Computer Program Products for Modeling A Monetary Measure for A Good Based Upon Technology Maturity Levels, filed Jun. 3, 2003, the contents of which is incorporated by reference in its entirety. For an example of the uncertainty (risk) associated with various growth rates (returns), as such may have been determined according to the above, see Table 1.

TABLE 1

| Growth Rate | Uncertainty |
|---|---|
| 10.0% | 20% |
| 12.5% | 30% |
| 15.0% | 40% |
| 17.5% | 50% |
| 20.0% | 60% |
| 22.5% | 70% |
| 25.0% | 80% |
| 27.5% | 90% |
| 30.0% | 100% |

Although a linear relationship between risk and return has been assumed above, risk and return need not have such a relationship. A linear relationship between risk and return is approximately reflective of the capital market relationship of risk and return, embodied in the well-known Capital Asset Pricing Model (CAPM) theory. In many instances, however, risk and return may not have a linear relationship. For example, some goods may have a high projected return with corresponding low risk when compared to CAPM.

After the growth rate has been defined and the uncertainty has been determined for the selected time segment (e.g., t=1) of the time period, the price sensitivity distribution (shown in FIG. 3 as a value distribution) can be determined based upon the standard deviation in time for the selected time segment and the mean price of the good for the time segment, as shown in block 36. The mean price of the good for the selected time segment can be determined in one embodiment based upon the mean price of the good for the previous time segment, and the growth rate for the current, selected time segment. For example, the mean price of the good for the selected time segment can be determined as follows:

$$\mu_t = \left(1 + \frac{GR_t}{100}\right) \times \mu_{t-1} \quad (1)$$

In equation (1), $\mu_t$ represents the mean price of the good for the current selected time segment, $\mu_{t-1}$ represents the mean value of the good at the immediately preceding time segment, and $GR_t$ represents the growth rate for the current selected time segment, where the growth rate is expressed in terms of a percentage.

Like the mean price of the good for each time segment, the standard deviation for the selected time segment can be determined in any of a number of different manners. In one embodiment, for example, the standard deviation can be determined as follows:

$$\sigma_t = \mu_t \times \sqrt{e^{\sigma_{avgt}^2 \times t} - 1} \quad (2)$$

In equation (2), t represents the current selected time segment, and $\sigma_t$ represents the standard deviation for the current selected time segment. Also in equation (2), $\sigma_{avgt}$ represents a running average of the uncertainty values from t=1 to the current selected time segment t, and can be determined, for example, as follows:

$$\sigma_{avgt} = \sqrt{\frac{\sum_{i=1}^{t} U_i^2}{t}} \quad (3)$$

where $U_i$ represents the uncertainty for the ith time segment, and i=1, 2, . . . t. For an example of the values of the growth rate, mean price of the good, uncertainty and standard deviation for each time segment in a period of 30 years, where each time segment represents one year, see Table 2 below.

TABLE 2

| Time (t) | Growth Rate ($GR_t$) | Mean ($\mu_t$) | Uncertainty ($U_i$) | Std. Dev. ($\sigma_t$) |
|---|---|---|---|---|
| 0 | — | $ 500 | — | — |
| 1 | 20% | $ 600 | 60% | $ 395 |
| 2 | 20% | $ 720 | 60% | $ 739 |
| 3 | 20% | $ 864 | 60% | $ 1,205 |
| 4 | 20% | $1,037 | 60% | $ 1,861 |
| 5 | 20% | $1,244 | 60% | $ 2,796 |
| 6 | 20% | $1,493 | 60% | $ 4,135 |
| 7 | 20% | $1,792 | 60% | $ 6,057 |
| 8 | 20% | $2,150 | 60% | $ 8,816 |
| 9 | 20% | $2,580 | 60% | $12,779 |
| 10 | 20% | $3,096 | 60% | $18,471 |
| 11 | 18% | $3,653 | 52% | $25,034 |
| 12 | 16% | $4,238 | 44% | $32,051 |
| 13 | 14% | $4,831 | 36% | $39,026 |
| 14 | 12% | $5,411 | 28% | $45,483 |
| 15 | 10% | $5,952 | 20% | $51,056 |
| 16 | 8% | $6,428 | 20% | $56,269 |
| 17 | 6% | $6,813 | 20% | $60,866 |
| 18 | 4% | $7,086 | 20% | $64,595 |
| 19 | 2% | $7,228 | 20% | $67,234 |
| 20 | 0% | $7,228 | 20% | $68,608 |
| 21 | −2% | $7,083 | 20% | $68,609 |
| 22 | −4% | $6,800 | 20% | $67,209 |
| 23 | −6% | $6,392 | 20% | $64,466 |
| 24 | −8% | $5,880 | 20% | $60,518 |
| 25 | −10% | $5,292 | 20% | $55,577 |
| 26 | −12% | $4,657 | 28% | $50,880 |
| 27 | −14% | $4,005 | 36% | $46,710 |
| 28 | −16% | $3,364 | 44% | $43,253 |
| 29 | −18% | $2,759 | 52% | $40,631 |
| 30 | −20% | $2,207 | 60% | $38,942 |

Future demand can be subject to a contingent activity, or event, which can impact the future demand (mean and uncertainty values) for subsequent time segments. For example, price (upon which demand is based) over a time segment can be subject to a contingent event, which reduces the price of the good, as shown in FIG. 4 at time t=3. By reducing the price, the mean price of the good (i.e., $\mu_{t-1}$) may be lowered (or raised) in the determination of the mean value over a subsequent time segment (i.e. $\mu_t$). As will also be appreciated, the contingent activity can itself be represented as a probability distribution. For example, the contingent activity comprising by a sudden change in the price of oil, or an unforeseen catastrophe can be represented by a price of the good if the contingent activity comes to fruition, and an associated probability of the contingent activity coming to fruition. Thus, as the mean value and standard deviation are determined, any contingent activities to which the price of the good for the selected time segment are subject can be accounted for to adjust the growth rate, uncertainty, mean value and/or standard deviation accordingly. By linking each time segment to the outcome of the prior time segment, embodiments of the present invention can advantageously provide the flexibility to incorporate contingent activities or endeavors or decisions that may occur at the transition between time segments.

After determining the mean value of the good and standard deviation over the selected time, the price sensitivity distribution can be determined for the selected time segment by defining the respective price sensitivity distribution according to the respective mean value of the good and standard deviation. The price sensitivity distribution can be expressed according to any of a number of different probability distribution types such as normal, triangular or uniform. But because the economy typically functions in a lognormal fashion, in a typical embodiment the price sensitivity distribution is expressed as a lognormal probability distribution. FIG. 5 illustrates an exemplary price sensitivity distribution defined for a selected time segment (e.g., t=1).

Again referring to FIG. 2, a market potential distribution can similarly be determined before, after or during determination of the price sensitivity distribution, irrespective of exactly how the price sensitivity distribution is determined, as shown in block 22. In addition to factoring uncertainty in the price of the good into the demand for the good over the selected time segment, the demand can advantageously be modeled as a function of the size of the market within which the good is purchased to thereby account for uncertainty in the size of the market. Uncertainty in the size of the market is typically represented as a market potential that refers to the total number of units of the good consumers will purchase presuming all consumer requirements are met, including price. The market potential is typically expressed as a distribution of consumers purchasing a predetermined number of units of the good. The market potential distribution generally assigns a probability to each respective number of units of the good consumers will purchase presuming all consumer requirements are met.

The market potential distribution for the selected time segment (e.g., t=1) can be determined in any of a number of different manners but, in one typical embodiment, the market potential is determined in a manner similar to that of the price sensitivity distribution (see FIG. 3). More particularly, the growth rate and uncertainty in the market determined for the selected time segment can be determined in the same manner as that explained above (see blocks 32 and 34), and can be the same or different from that determined for the price sensitivity distribution. The market potential distribution (value distribution) can then be determined based upon the standard deviation in time for the selected time segment and the mean market size (number of units) of the good for the time segment. In accordance with equation (1) above, for example, the mean market size (i.e., $\mu_t$) for the selected time segment is determined based upon the mean market size for the previous time segment (i.e., $\mu_{t-1}$), and the growth rate for the current, selected time segment. Likewise, in accordance with equations (2) and (3) above, for example, the standard deviation for the selected time segment can be determined based upon the mean market size for the selected time segment and a running average (i.e., $\sigma_{avgt}$) of the uncertainty values from t=1 to the current selected time segment. The market potential distribution can then be determined based upon the standard deviation in time for the selected time segment and the mean market size for the time segment (see block 36).

Advantageously, the market potential distribution can also be developed from sparse data from any one of a number of different sources, such as market studies or a myriad of other factors as known to those skilled in the art. The market potential distribution can be expressed according to any of a number of different probability distribution types such as normal, triangular or uniform but, like the market sensitivity distribution, the market potential distribution is typically expressed as a lognormal probability distribution. For example, FIG. 6 illustrates an exemplary market potential distribution defined for a selected time segment (e.g., t=1).

The demand for the good is modeled as a function of the size of the market within which the good is sold. Thus, to model the demand for the good for the selected time segment (e.g., t=1), a forecasted market of a predefined total number of units of the good is selected from the market potential distribution for the selected time segment. Advantageously, the number of units in the forecasted market is selected according to a method for randomly selecting a predefined number of units of the good, such as the Monte Carlo method. As known to those skilled in the art, the Monte Carlo method is a method of randomly generating values for uncertain variables to simulate a model. The Monte Carlo method is applied to the market potential distribution to select the predefined number of units of the good in the forecasted market, as shown in block 24 of FIG. 2.

As manufacturers will typically not be capable of capturing all (i.e., 100%) of the market for a good, demand for the good can be modeled to account for different percentages of the market that a manufacturer may capture. Therefore, from the forecasted market for the selected time segment (e.g., t=1), a market penetration distribution for the selected time segment can be determined based upon different numbers of units that represent corresponding percentages of the forecasted market, as shown in block 26. For example, as shown in FIG. 7, in a market size of 700 units of the good, a sale of 350 units would be associated with a market penetration of 50%. In an alternative market penetration distribution, represented as a dotted line in FIG. 7, in a market size of 700 units of the good, a sale of 200 units would be associated with a market penetration of 50%. As will be appreciated, then, the market penetration may or may not directly correspond to the ratio of units sold/units available. In this regard, although market penetration may initially correspond to the ratio of units sold/units available, a number of different factors may cause the values to deviate. For example, volume discounting may curve the market penetration distribution in a non-linear manner, such as in the case represented by the dotted line in FIG. 7. By comparison, the case represented by the straight line may represent a risk neutral market without volume discounting, such as a true commodity market. Increasing curvature of the straight line, then, may imply a risk-adverse market where larger unit purchases are price discounted to account for the consumer's decreasing utility of additional purchased units. Thus, the dotted, curved line in FIG. 7 may represent a negative correlation between price and units sold in a contract (differentiated market).

Once the market penetration distribution has been determined, the demand for the selected time segment can be modeled based upon the price sensitivity distribution and the market penetration distribution for the selected time segment. To combine the price sensitivity distribution and the market penetration distribution, the price sensitivity distribution is typically first recast in reverse cumulative format, as shown in FIG. 8*a*. (see FIG. 2, block 28). As will be apparent, a reverse cumulative distribution depicts the number, proportion or percentage of values greater than or equal to a given value. The reverse cumulative of the price sensitivity distribution represents the distribution of a unit purchase of the good for at least a predetermined price, i.e., at or above a predetermined price.

Similarly, when modeling supply for the selected time segment (e.g., t=1), to combine the price sensitivity distribution and the market penetration distribution, the price sensitivity distribution is typically first recast in cumulative format, as shown in FIG. 8*b*. As will be apparent, a cumulative distribution depicts the number, proportion or percentage of values less than or equal to a given value. The cumulative of the price sensitivity distribution represents the distribution of a unit manufactured when the market price for the good is at least a predetermined price, i.e., at or above a predetermined price.

Once the price sensitivity distribution has been recast, the demand for the good in the forecasted market for the selected time segment (e.g., t=1) can be modeled based upon the reverse cumulative of the price sensitivity distribution and the market penetration distribution, as shown in block 30 of FIG. 2. For the forecasted market, the demand represents the number of units consumers will purchase for at least a given price, i.e., at or above a given price. To model the demand, each probability percent of the reverse cumulative of the price sensitivity distribution is associated with a corresponding percentage of the forecasted market from the market penetration distribution. Thus, each of a plurality of different numbers of units of the good from the market penetration distribution are linked to a minimum price per unit from the reverse cumulative price sensitivity distribution having a probability percent equal to the market penetration percent for the respective number of units. As such, the demand model can be thought of as a plurality of different numbers of units sold in the forecasted market, each number of units having a corresponding minimum price at which consumers will purchase the respective number of units. For example, a number of goods totaling 700 and having a market penetration of 100% is linked to a price per unit of approximately $77 million dollars having a probability percent of 100%. Thus, according to the demand model, 700 units of the good will sell for at least $77 million dollars. The demand model can be represented in any one of a number of manners but, in one embodiment, the demand model is represented as a demand curve by plotting different numbers of units sold in the forecasted market versus the minimum price consumers will pay per unit for the good, as shown in FIG. 9a.

Similar to modeling demand, the supply for the product in the forecasted market for the selected time segment (e.g., t=1) can be modeled based upon the cumulative of the price sensitivity distribution and the market penetration distribution. For the forecasted market, then, the supply represents the number of units manufacturers will produce when the market price for the good is at least a given price, i.e., at or above a given price. To model the supply, each probability percent of the cumulative of the price sensitivity distribution is associated with a corresponding percentage of the forecasted market from the market penetration distribution. Thus, each of a plurality of different numbers of units of the good from the market penetration distribution are linked to a maximum price per unit from the cumulative price sensitivity distribution having a probability percent equal to the market penetration percent for the respective number of units. As such, the supply model can be thought of as a plurality of different numbers of units produced in the forecasted market, each number of units having a corresponding maximum market price. Like the demand model, the supply model can be represented in any one of a number of manners. In one embodiment, for example, the supply model is represented as a supply curve by plotting different numbers of units produced in the forecasted market versus the maximum market price of the good, as shown in FIG. 9b.

As indicated above, the demand for the good for the selected time segment (e.g., t=1) is based upon the reverse cumulative of the price sensitivity distribution and the market penetration distribution for the selected time segment, and the supply for the good is based upon the cumulative of the price sensitivity distribution and the market distribution for the selected time segment. The steps in determining the reverse cumulative (or cumulative) of the price sensitivity distribution and the market penetration distribution can be accomplished in any order relative to one another without departing from the spirit and scope of the present invention. For example, the price sensitivity distribution can be rewritten in reverse cumulative format before any or all of the steps in determining the market penetration distribution from the market potential distribution.

B. Goods in Differentiated Markets

Just as in the case of non-differentiated markets, to most accurately model the demand and/or supply for the good in an uncertain, differentiated market over a period of time, the demand is typically modeled based upon a distribution of the possible prices for which the good may be sold, and a distribution of the possible sizes of the market within which the good may be sold and/or produced. Thus, the demand and/or supply for a good in a differentiated market over a period of time can be modeled based upon a price sensitivity distribution and a market potential distribution for each time segment, such as those explained above.

As previously stated, however, non-differentiated markets differ from differentiated markets in that goods in non-differentiated markets are all sold and purchased for a uniform price, as opposed to differing prices based on individual units. In a differentiated market, the goods are sold according to contracts that each specify a predetermined number of units of the good at a predetermined-price for each unit. Thus, not only does the price of the good change with the size of the market, but the price changes with each contract within the size of the market. As such, for differentiated markets, modeling the demand for the good may further include assessing the uncertainty in the number of contracts in the market, as well as uncertainty in the predetermined number of units of the good in each contract and the predetermined price per unit at which each unit in each contract is purchased. For more information on one such method for modeling demand and/or supply, as well as patentability, for a good in a forecasted, differentiated market, see U.S. patent application Ser. No. 10/453,727, entitled: Systems, Methods and Computer Program Products for Modeling Demand, Supply and Associated Profitability of a Good, both filed on Jun. 3, 2003.

Referring now to FIG. 10, in another method for modeling demand in a differentiated market, demand in a differentiated market is estimated from demand in a non-differentiated market. Briefly, in accordance with this embodiment of the present invention, demand in a differentiated market is modeled by first modeling demand in a non-differentiated market, as shown in block 38. Whereas demand in the non-differentiated market can be modeled in any of a number of different manners, in one embodiment demand in the non-differentiated market is modeled in the manner explained above with reference to FIGS. 2-9. Thereafter, the non-differentiated demand model is integrated over the forecasted market to model or otherwise estimate demand for the good in a corresponding differentiated market.

Whereas the non-differentiated demand model can be integrated in any of a number of different manners to model demand in a corresponding differentiated market, one method of integrating a non-differentiated demand model will now be described with reference to FIG. 11. As shown in block 42 of FIG. 11, one method for integrating a non-differentiated demand model includes segmenting the forecasted market into a plurality of market segments. The forecasted market can begin with unit u=0 and extend to u=U, where U represents the size of the forecasted market. The forecasted market can then be segmented into a number of different market segments. In one embodiment, the forecasted market U is defined such that each market segment can be represented as a percentage of U, i.e., u=1% U, 2% U, . . . , 100% U. Thus, for example, the forecasted market can be defined as a number of units of the good (e.g., U=700), where the forecasted market is divided into one hundred one-percent market segments.

Each market segment begins with unit u−1% U and ends with unit u, and is defined by the ending unit u. Thus, market segment u=1% U extends from unit u=0 to unit u=1% U (e.g., 7 for U=700). Market segment u=2% U extends from unit u=1% U to unit u=2% U (e.g., 14 for U=700). Similarly, market segment u=3% U extends from units u=2% U to u=3% U (e.g., 21 for U=700). The market segments then continue until market segment u=100% U, which extends from units u=99% U (e.g., 693 for U=700) to u=100% U (e.g., 700 for U=700). For an example of the segmentation of the market of the non-differentiated demand model of FIG. 9a, see FIG. 12a.

After segmenting the forecasted market into a plurality of market segments, a market segment can be selected, typically beginning with the market segment u=1% U, as shown in block 44. After selecting a market segment, the price per unit of the good over the selected market segment is calculated. As previously indicated, the demand for the good in the forecasted market represents the number of units consumers may purchase for at least a given price. Thus, the price per unit of the selected market segment can be calculated by calculating the average the non-differentiated market price per unit of the good for the market segments up to, and including, the selected market segment, and associating the average with the selected market segment, as shown in blocks 46 and 48. Thus, for the first market segment u=1% U, the average non-differentiated market price per unit can be calculated from the non-differentiated demand model as the non-differentiated market price per unit for u=1% U units (e.g., 7 units).

The price per unit of the good can be calculated for each market segment (e.g., u=1% U, 2% U, . . . 100% U) of the forecasted market, as shown in block 50, and again in blocks 44, 46 and 48. For each market segment of the forecasted market, the associated price per unit can be calculated by averaging the non-differentiated market price per unit of the good for the market segments up to, and including, the respective market segment. For market segment u=2% U, then, the average non-differentiated market price per unit can be calculated by summing the non-differentiated market price per unit for u=1% U units and u=2% U units (e.g., 14), and dividing the sum by two. For market segment u=3% U, the average non-differentiated market price per unit can be calculated by summing the non-differentiated market price per unit for u=1% U units, u=2% U units and u=3% U units (e.g., 21), and dividing the sum by three. Finally, for market segment u=100% U, the average non-differentiated market price per unit can be calculated by summing the non-differentiated market price per unit for u=1% U units through u=100% U units (e.g., 700), and dividing the sum by one hundred.

After calculating an associated price per unit for each market segment in the forecasted market, demand for the good in the differentiated market can be modeled or otherwise estimated based upon the units u that define the market segments and the respective, associated prices per unit, as shown in block 52. As such, the differentiated demand model can be thought of as a plurality of different numbers of units sold in segments of the forecasted market, each number of units having a corresponding minimum price at which consumers will purchase the respective number of units. Similar to the non-differentiated demand model, the differentiated demand model can be represented in any one of a number of manners but, in one embodiment, the differentiated demand model is represented as a demand curve by plotting the numbers of units sold in the forecasted market for the different market segments versus the minimum price consumers will pay per unit for the good, as shown in FIG. 12b against a corresponding non-differentiated demand model.

Similar to modeling demand, the supply for the product in a forecasted, differentiated market for the selected time segment (e.g., t=1) can be modeled in a number of different manners, including that described in U.S. patent application Ser. No. 10/453,727. Alternatively, in a manner similar to that of modeling demand explained more particularly above, supply in a differentiated market can be modeled or otherwise estimated based upon a corresponding non-differentiated supply model. To model the supply, non-differentiated supply can be modeled, such as in the manner explained above. Thereafter, differentiated supply can be modeled by integrating the non-differentiated supply model. More particularly, differentiated supply can be modeled by segmenting the forecasted market into a plurality of segments, as shown, for example, in FIG. 13a for the non-differentiated supply model of FIG. 9b. For each segment, then, an associated price per unit can be calculated by averaging the non-differentiated market price per unit of the good for the market including, and after, the respective market segment. Thus, the supply model can be thought of as the numbers of units produced in the forecasted market for each of a plurality of market segments, each market segment having a corresponding maximum market price. Like the demand model, the supply model can be represented in any one of a number of manners. In one embodiment, for example, the supply model is represented as a supply curve by plotting the numbers of units produced in the forecasted market for the different market segments versus the maximum market price of the good, as shown in FIG. 13b against a corresponding non-differentiated supply model.

Just as in the case of modeling demand/supply in a non-differentiated market, the steps in modeling demand/supply in a differentiated market can be accomplished in any of a number of different orders relative to one another, including the order explained above, without departing from the spirit and scope of the present invention. For example, the market segments can be selected beginning with the last market segment (e.g., u=100% U), and proceed through to the first market segment (e.g., u=1% U). It should further be understood that demand/supply in the differentiated market need not be modeled across the entire forecasted market. Differentiated demand/supply can be modeled from the first market segment through a portion of the forecasted market (e.g., u=50% U), from the last market segment through a portion of the forecasted market, or for an intermediate portion of the forecasted market (e.g., from u=20% U through u=80% U).

C. Goods in Aggregate Markets

Various markets for goods are actually aggregate markets formed of a plurality of independent markets that at least partially converge with one another. In the travel industry, for example, an aggregate traveler market may be formed when travelers from several connecting cities converge on a city-pair travel. More particularly, for example, travelers may have different origin and destination cities, but converge on a particular city-pair to complete their journey. Thus, a city-pair (A to B) market may comprise an aggregate market of up to four independent traveler route markets: "A to B," "behind A to B," "A to beyond B," and "behind A to beyond B." In another exemplary industry, the automotive industry, aggregate automobile markets for different types of automobiles, such as trucks, sedans, sport utility vehicles (SUVs) and the like, where the aggregate markets may be formed from component markets for different characteristics of the respective types of automobiles, such as for different makes, models or the like.

More particularly, for example, an aggregate SUV market may be formed of component SUV markets, where all of the component markets generally include SUVs, but are distinct from one another in characteristics of the SUVs in the respective component market (e.g., size, performance, price, etc.). Thus a SUV market may comprise an aggregate of smaller component SUV markets, such as a compact SUV market, mid-size SUV market, full-size SUV market, luxury SUV market and/or hybrid SUV market.

As will also be appreciated, in instances of an aggregate market including a plurality of individual markets, one or more of the markets may influence, or be correlated with, one or more of the other markets, thereby causing distortions in the aggregate market. In the travel industry, for example, each origin-destination market may have its own price (e.g., fare) and number of units of a good (e.g., travel tickets) relationship depending upon underlying economic dynamics. Travelers may pay differing prices for units of a good with differing origin and destination cities, but which include a common city-pair. However, because a number of travel industries (e.g., airline industry) apportion revenues to the distance the traveler travels (e.g., revenue seat miles), revenues from different travelers for the same city-pair may differ. Thus, demand in the aggregate market may exhibit price-unit relationship distortions as a result of differing economic dynamics of the underlying contributing markets. These distortions may be indications of market place inefficiencies. Conventionally, however, these distortions are typically not sufficiently reflected in modeling demand for the good in the aggregate market. Thus, in instances of a good in an aggregate market, embodiments of the present invention permit individually modeling demand/supply for the good in the component markets that form the aggregate market, and then aggregating the individual models to form an aggregate market model.

One method for modeling demand/supply for a good in an aggregate market will now be described with reference to FIG. 14. As shown and described with respect to FIG. 14, demand is modeled for a good in an aggregate, differentiated market. It should be understood, however, that supply can be similarly modeled for a good in an aggregate, differentiated market without departing from the spirit and scope of the present invention. Further, it should be understood that demand and/or supply can equally be modeled for a good in an aggregate, non-differentiated market.

As shown in block 54 of FIG. 14, a method of modeling demand in an aggregate market includes defining the component markets forming the aggregate market. Each component market can be defined in any of a number of different manners. In one embodiment, for example, each component market is defined by a price sensitivity distribution and, if so desired, a market potential distribution, where the distributions may be determined in a manner such as that explained above. Then, after defining the component markets, demand for the good in each of the component markets is modeled as shown in block 56. In the case of differentiated markets, for example, demand for the good in each of the component markets can be modeled in the manner explained above with respect to FIGS. 10 and 11.

After modeling demand for the good in each of the component markets, the component-market demand models are combined to model demand for the good in the aggregate market, as shown in block 58. The component-market demand models can be combined in a number of different manners. One technique, referred to as the numerical method, models demand in the aggregate market utilizing the market segments and prices per unit of the good associated with those market segments for the component markets (calculated for the market segments during modeling of the component markets). In another technique, referred to as the mathematical method, demand in the aggregate market is modeled utilizing the market segments of the component markets and the distribution(s) defining the component markets.

More particularly, modeling demand in the aggregate market in accordance with the numerical method includes ranking the price per unit of each market segment across all of the component markets, such as in an ascending order from the lowest price per unit up, or in a descending order from the highest price per unit down. A cumulative number of units for each different price per unit can then be calculated. In the case of ranking the price per unit in descending order, the cumulative number of units for each price can equal the cumulative number units sold for a price per unit equal to or greater than the respective price across all market segments of all of the component markets. Alternatively, in the case of ranking the price per unit in ascending order, the cumulative number of units for each price can equal the cumulative number units sold for a price per unit less than the respective price across all market segments of all of the component markets. More particularly, for example, when ranking the price per unit in descending order, the cumulative number of units associated with the highest price per unit would equal the number of units in each market segment having the highest price per unit. Then, the cumulative number of units associated with the second highest price per unit would equal the number of units in each market segment having the second highest price per unit plus the number of units in each market segment having the highest price per unit.

Continuing the numerical method, with each different price per unit and the associated cumulative number of units, demand for the good in the aggregate market can be modeled based upon the price per unit of each of the segments and the cumulative number of units sold for a price per unit equal to or greater than the respective price per unit. As before, the aggregate market demand model can be thought of as a plurality of different numbers of units sold in the forecasted, aggregate market, each number of units having a corresponding minimum price at which consumers will purchase the respective number of units. For examples of the demand of three component markets modeled relative to one another and relative to the corresponding aggregate market, see FIG. 15.

The mathematical method of combining the component-market demand models to model demand in the aggregate market provides a nearly equivalent, but typically computationally more efficient, implementation than the numerical method to calculate aggregation of component markets. In accordance with one embodiment, modeling demand in the aggregate market in accordance with the mathematical method includes calculating a mean price of the good and an associated standard deviation for the aggregate market. The mean and associated standard deviation for the aggregate market can be calculated in any of a number of different manners. Consider, for example, the case of differentiated markets, when demand for the good in each of the component markets is modeled in the manner explained above with respect to FIGS. 10 and 11. In such a case, the mean can be calculated by first calculating an average price of the good in each of the component markets, such as by averaging the price per unit of the good for each market segment (e.g., $u=1\% \ U, 2\% \ U, \ldots 100\% \ U$) of the respective component markets. The average price for each component market can then be weighted by multiplying the average price by the fraction of the number of units of the good in the component market to the number of units in the aggregate market. Thereafter, the mean can be calculated by summing the weighted average prices for the component markets.

Similar to the technique for calculating the mean, the associated standard deviation for the aggregate market can be calculated based upon weighted contributions of the component markets to the overall aggregate market. The calculation of the standard deviation can be similar to standard variance equations. In this regard, for component markets k=1, . . . n, the total number of units in the aggregate market, U, can be calculated by summing the number of units in the component markets, $U_k$. For the market segments (e.g., $u_k$=1% $U_k$, 2% $U_k$, . . . 100% $U_k$) of the respective component markets, first and second sum values can be calculated as follows:

$$\text{Sum1} = \sum_{u=1\% U, k=1}^{100\% U, n} u_k \times \sum_{u=1\% U}^{100\% U} \text{Price}_{u_k}^2 \quad (4)$$

$$\text{Sum2} = \sum_{u=1\% U, k=1}^{100\% U, n} u_k \times \sum_{u=1\% U}^{100\% U} \text{Price}_{u_k} \quad (5)$$

where $\text{Price}_{u_k}$ represents the price per unit of the good for the respective market segment of the respective component market. Thereafter, the standard deviation for the aggregate market can be calculated in accordance with the following equation (6):

$$\text{MultiMarketStdDev} = \sqrt{\frac{(U \times \text{Sum1}) - \text{Sum2}^2}{U^2 - U}} \quad (6)$$

After determining the mean value of the good and standard deviation over the selected time, a price sensitivity distribution of a unit purchase of the good in the aggregate market can be determined for the selected time segment by defining the respective price sensitivity distribution according to the respective mean value of the good and standard deviation, such as in the same manner explained above and in the aforementioned '727 application (see FIG. 5).

In addition to a price sensitivity distribution, a market penetration for the aggregate market can be determined from the aggregate number of units of the good, U. More particularly, for example, a market penetration for the aggregate market can be determined based upon the different numbers of units that represent corresponding percentages of the forecasted market, as also explained above and in the '727 application (see FIG. 7). Then, once the price sensitivity and market penetration distributions have been determined, the demand for the good in the aggregate market can be modeled based upon the price sensitivity distribution and the market penetration distribution for the selected time segment. To combine the price sensitivity distribution and the market penetration distribution, the price sensitivity distribution can be recast in reverse cumulative format (see FIG. 8a). Demand for the good in the aggregate market can then be modeled based upon the reverse cumulative of the price sensitivity distribution and the market penetration distribution, such as in the same manner explained above and in the '727 application (see FIG. 9a).

Again referring to FIG. 1, irrespective of whether demand in the aggregate market is modeled in accordance with the numerical method or the mathematical method, the demand for the good in the market can be modeled for each time segment (e.g., t=1, 2, . . . T) of the time period T, as shown in block 18, and again in blocks 14 and 16. Unless otherwise indicated, the "market" described below may comprise a non-differentiated or differentiated market, which may represent a single market, component market or aggregate market. For each time segment of the time period in a non-differentiated market, for example, a price sensitivity distribution and market potential distribution can be determined (see blocks 20 and 22). Also for each time segment, a forecasted market size can be selected, with a market penetration distribution determined based upon the forecasted market (see blocks 24 and 26). The price sensitivity distribution can be rewritten into a reverse cumulative distribution (see block 28), which can thereafter be used with the market penetration distribution to model demand for the respective time segment. Thus, each time segment can include a different price sensitivity distribution, market potential distribution, forecasted market, market penetration distribution and reverse cumulative price sensitivity distribution, thus resulting in a different model of the demand for the good. For example, for a time period of thirty years (T=30) with one-year segments, the good can have an associated demand model for each year, which can remain the same or differ from one year to the next. The demand model for the different segments can be represented in any one of a number of manners but, in one embodiment, the demand models are represented as demand curves by plotting different numbers of units sold in the forecasted market for each segment versus the minimum price consumers will pay per unit for the good, as shown with respect to three segments (i.e., years 1, 10 and 19) in FIG. 16.

As described below, modeling the demand for the good can be used with a cost model to model profitability for the good in the forecasted market for each time segment. In turn, the profitability model can be used to determine conclusions regarding the good over the period of time, such as the optimum price per unit and the number of units sold for each time segment. The conclusions for the segments of the time period can then be used, such as by the manufacturer, to facilitate an understanding of how uncertainty in the price of the good and number of units in the market affect demand for the good over time. With such an understanding, the manufacturer can be in a better position to select a price at which to sell each unit of the good, as well as a number of units of the good to produce.

II. Modeling the Profitability of a Good

By utilizing the demand for the good, modeled over the time segments of the time period according to embodiments of the present invention, the profitability of the good over the time segments of the time period can be modeled thereby facilitating an understanding of how uncertainty in demand for the good, as well as uncertainty in cost of producing the good, can affect profitability over time. Just as the demand model differs depending on whether the goods are in a non-differentiated market or a differentiated market, the profitability of the good also differs depending on the type of market. As such, the present invention provides systems, methods and computer program products for modeling the profitability of a good over time in both non-differentiated markets as well as differentiated markets.

A. Goods in Non-Differentiated Markets

Modeling the profitability of a good over segments of a time period in a non-differentiated market generally includes modeling the demand for the good over those segments, such as according to embodiments of the present invention as described above with reference to FIGS. 1-9. Along with modeling the demand for the good, the cost of producing the good is also modeled over the segments of the time period. The cost model for each time segment can be based on the average cost per unit to produce the good and the number of units produced, or sold. The cost model for a time segment accounts for uncertainty in the size of the market, just as does the demand model for that time segment. Further, whereas the cost of producing the good can be modeled in any one of a number of manners, the cost preferably considers the effect of the number of units produced, or sold, on the cost to produce each unit of the good. Costs associated with producing a good in many markets tend to decline as the manufacturer gains experience with that production.

Whereas one might expect the cost of producing each unit of the good to remain constant, the cost to produce each unit of the good is typically more than the expected cost of producing each unit for the first units produced. And as the number of units produced increases, the manufacturer typically gains experience that drives the cost to produce each unit down to and below the expected cost, and thereafter eventually leveling to an optimum cost of producing each unit. The change in the cost to produce each unit can generally be considered to be attributable to a "learning curve" experienced by the manufacturer in manufacturing the good. A cost model accounting for a learning curve can be represented in any one of a number of different manners but, in one embodiment, the cost model is represented as a reverse cumulative cost curve by plotting the different costs per unit versus the cumulative number of units produced for the respective cost per unit, as shown in FIG. 17. As an example of one method by which the cost to produce each unit of a good in a non-differentiated market can be modeled, see U.S. patent application Ser. No. 10/453,779, entitled: Systems, Methods and Computer Program Products for Determining A Learning Curve Value and Modeling Associated Profitability and Costs of A Good, filed Jun. 3, 2003, the contents of which are hereby incorporated by reference in its entirety.

For a given time segment t of the time period T, once the demand and cost have been modeled for a forecasted market, the profitability for the good in the forecasted market for the respective time segment can be modeled. The profitability for a time segment can be represented as the result of subtracting the cost per unit from the price per unit and multiplying the difference by the number of units sold for the corresponding fraction of the forecasted market. Graphically, as shown in FIG. 18 with respect to a given time segment, by simultaneously plotting the demand curve and the cost curve for the forecasted market, the profitability for the respective time segment can be seen as directly related to the distance between the two curves. Like the demand model and the cost model, the profitability model for the respective time segment can be represented in any one of a number of different manners. In one embodiment, shown in FIG. 19, the profitability model for a given time segment can be represented as a profitability curve by plotting the number of units that must be sold to achieve at least a given profit.

From the profitability model, as well as the demand and cost models, conclusions regarding the forecasted market of the respective time segment can be drawn from collectively modeling the demand, cost and profitability for the forecasted market of the respective time segment. For example, the maximum profit for the good in the forecasted market of the respective time segment can be seen as the point where the price exceeds the cost by the greatest amount. By determining the maximum profit, the optimum price for each unit of the good and the optimum number of units sold in the forecasted market (i.e., fraction of the number of goods in the market), as well as the corresponding cost associated with the optimum price and number of units sold, in the forecasted market of the respective time segment can be determined. Additionally, or alternatively, other conclusions respective of the maximum profit, the optimum price, number of units and cost can be determined for the respective time segment. For example, the maximum profit margin for the forecasted market of the respective time segment can be determined by dividing the difference between the optimum price and associated cost by the optimum price, and thereafter recorded. Further, the price per unit and number of units at which the forecasted market clears can be determined from the point where the profitability is zero (or the point where the demand model intersects the cost model).

The profitability for the good in a forecasted market can similarly be modeled for each of the time segments t of the time period T, with conclusions drawn from the respective demand, cost and profitability models for the respective time segments. Those conclusions can then be plotted to develop or otherwise create a business case for the good over time. For example, the business case can receive the optimum number of units for each time segment, and plot the optimum number of units over the time period, as shown in FIG. 20. Similarly, for example, the business case can receive the maximum forecasted profit (e.g., gross profit) for each time segment, and plot the maximum profit over the time period, as shown in FIG. 21. In another example, the business case can receive the maximum forecasted profit for each time segment, and plot the maximum profit against the volatility (uncertainty) in the number of units of the good sold (see block 22 of FIG. 2 with respect to determining the market potential distribution), as shown in FIG. 22. From the illustrated scatter plot, then, a best fit curve can be formed from the points of maximum profit and associated uncertainty in the number of units of the good to illustrate the consistency, or lack thereof, in profitability of the good in an uncertain market.

B. Goods in Differentiated Markets

In differentiated markets, modeling the profitability can proceed in a manner similar to that explained above with respect to modeling the profitability in non-differentiated markets. The demand for the good and cost of producing the good for each time segment can be modeled in a manner similar to that explained above and in U.S. patent application Ser. No. 10/453,727. Profitability in the differentiated market for each time segment can then be represented in a manner similar to the non-differentiated market. Further, just as in the case with goods in non-differentiated markets, in differentiated markets conclusions regarding the forecasted market for each time segment can be drawn from collectively modeling the demand, cost (or lowest cost value) and profitability for the forecasted market in the respective time segments.

In the case of both non-differentiated markets and differentiated markets, for certain quantities of units sold in certain time segments, the profitability model actually demonstrates a negative profitability, or a loss for sales of the good, as shown in FIG. 19. Thus, it is oftentimes desirable to determine whether the profitability of the good is positive before exercising a contingent claim, such as whether to initiate or continue the project. Alternatively, it is desirable to determine whether the profitability of the good is above a predetermined threshold before exercising the contingent claim. Contingent claims oftentimes come in the form of a call in which the manufacturer has an option to invest an amount of money, or additional amounts of money, in order to start producing or continue producing the good. As such, if the initial stages of the production and sale of the good have proved unsuccessful and/or if the future prospects for the profitability of the good appear bleak, the manufacturer will likely decline to invest the money, or additional money, and thereby forego exercise of the call and will therefore decline to produce the good or terminate production of the good. Alternatively, if the initial stages of the production and sale of the good have been successful and/or if the prospects of the profitability of the good are bright, the manufacturer will likely make the necessary investment in order to begin or continue production of the good.

Regardless of the type of contingent claim, it is desirable to determine the value of a good and, in particular, the contingent claim at the present time. By determining the value of the contingent claim, the manufacturer can avoid overpaying for production of the good as a result of an overvaluation of the contingent claim. Conversely, the manufacturer can identify goods in which the value of the contingent claim has been undervalued and can give strong consideration to investing in the production of these goods since they likely represent worthwhile investment opportunities. As such, by modeling the demand and cost of a good and, thus, the profitability of a good, the systems, methods and computer program products of the present invention can facilitate determining the value of the good and, in particular, the contingent claim at the present time. For more information on determining the value of the project, see U.S. patent application Ser. No. 09/902,021 entitled: Systems, Methods and Computer Program Products for Performing a Generalized Contingent Claim Valuation, filed Jul. 10, 2001 and published on Jan. 16, 2003 as U.S. Patent Application Publication No. 2003/0014337; and U.S. patent application Ser. No. 10/453,396 entitled: Systems, Methods and Computer Program Products for Modeling Uncertain Future Benefits, filed Jun. 3, 2003 and published on Dec. 9, 2004 as U.S. Patent Application Publication No. 2004/0249642, the contents of both of which are hereby incorporated by reference in its entirety.

The systems, methods and computer program products of the present invention therefore are capable of modeling uncertain future demand, supply and associated profitability of a good over a period of time based on sparse historical data or estimates regarding price and quantity of the good. By selecting a forecasted market for each segment of the time period according to the Monte Carlo method based upon a market potential distribution associated with the respective segment, embodiments of the present invention are capable of modeling uncertain future demand, supply and, thus the profitability as a function of the size of the market within which the good is sold more adequately than conventional methods of modeling the demand. Further, by including a lognormal price sensitivity distribution, embodiments of the present invention are capable of modeling uncertain future demand, supply and associated profitability for each segment of the time period while better accounting for how changing the price of the good changes the number of units of the good purchased.

By accounting for variability, or uncertainty, in the price of the good and the number of units of the good purchased over each time segment, embodiments of the present invention are capable of modeling uncertain future demand, supply and associated profitability over time to thereby facilitate an understanding of how uncertainty in a market over time affects demand, supply and profitability. Such an understanding can be advantageous to those associated with the manufacture, sale and purchase of the good, such as in the context of commercial transactions. Programs for the future sale of goods inherently have associated uncertainty, particularly as it relates to the market for the goods, typically defined by the number of good purchased and the price at which each unit of the good is purchased. According to embodiments of the present invention, for example, demand, supply and associated profitability of a good can be modeled in a manner such that a manufacturer can be in a better position to not only decide whether to bring a good to market, but to also select a price at which to sell each unit of the good, as well as a number of units of the good to produce.

As shown in FIG. 23, the system of embodiments of the present invention is typically embodied by a processing element and an associated memory device, both of which are commonly comprised by a computer 60 or the like. As indicated above, the method of embodiments of the present invention can be performed by the processing element manipulating data stored by the memory device with any one of a number of commercially available computer software programs. In one embodiment, the method can be performed with data that is capable of being manipulated and/or presented in spreadsheet form. For example, the method can be performed by the processing element manipulating data stored by the memory device with Excel, a spreadsheet software program distributed by the Microsoft Corporation of Redmond, Wash., including Crystal Ball, a Monte Carlo simulation software program distributed by Decisioneering, Inc. of Denver, Colo. The computer can include a display 62 for presenting information relative to performing embodiments of the method of the present invention, including the various distributions, models and/or conclusions as determined according to embodiments of the present invention. To plot information relative to performing embodiments of the method of the present invention, the computer can further include a printer 64.

Also, the computer 60 can include a means for locally or remotely transferring the information relative to performing embodiments of the method of the present invention. For example, the computer can include a facsimile machine 66 for transmitting information to other facsimile machines, computers or the like. Additionally, or alternatively, the computer can include a modem 68 to transfer information to other computers or the like. Further, the computer can include an interface (not shown) to a network, such as a local area network (LAN), and/or a wide area network (WAN). For example, the computer can include an Ethernet Personal Computer Memory Card International Association (PCM-CIA) card configured to transmit and receive information to and from a LAN, WAN or the like.

In one advantageous technique applicable to embodiments of the present invention, the methods according to embodiments of the present invention may be embodied in a software or data module, component, portfolio or the like, that can be manipulated or otherwise operated within a spreadsheet software program such as Excel. Such a technique may be advantageous in a number of different contexts, such as in the context of financial modeling and analysis. Modules, components and/or portfolio that perform various financial modeling functions can be combined to gain a more complete understanding of a financial context. A brief description of such a technique as such may be applied to the present invention will now be described below.

According to such a technique, data capable of being manipulated to perform at least a portion of the methods of the present invention can be embodied in a module, which can thereafter be linked or otherwise associated with other portions of the methods of the present invention embodied in other modules so as to formulate a component. Then, if so desired, the component can be linked or otherwise associated with other components capable of performing other related methods to thereby form a portfolio. For example, methods of modeling future demand according to embodiments of the present invention can be embodied in one module while methods of modeling cost according to embodiments of the present invention can be embodied in another module. The two modules can then be linked or otherwise associated with one another to formulate a component capable of generating a business case capable of modeling the profitability of the good based upon the future demand and cost. Then, if so desired, the component for generating the business case can be linked or otherwise associated with another component to perform another function.

According to one aspect of the present invention, the system of the present invention generally operates under control of a computer program product. The computer program product for performing the methods of embodiments of the present invention includes a computer-readable storage medium, such as the non-volatile storage medium, and computer-readable program code portions, such as a series of computer instructions, embodied in the computer-readable storage medium. It should be understood that the computer-readable program code portions may include separate executable portions for performing distinct functions to accomplish methods of embodiments of the present invention. Additionally, or alternatively, one or more of the computer-readable program code portions may include one or more executable portions for performing more than one function to thereby accomplish methods of embodiments of the present invention.

FIGS. 1 and 2 are a flowchart of methods, systems and program products according to the invention. It will be understood that each block or step of the flowchart, and combinations of blocks in the flowchart, can be implemented by computer program instructions. These computer program instructions may be loaded onto a computer or other programmable apparatus to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that each block or step of the flowchart, and combinations of blocks or steps in the flowchart, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus comprising:
    a processor configured to determine a plurality of price sensitivity probability distributions of a price per unit of a good for a respective plurality of time segments of a period of time, the price sensitivity probability distribution for each time segment assigning a respective probability to each of a plurality of different predetermined prices per unit of the good, the price sensitivity probability distribution reflecting an uncertainty in the price per unit of the good,
    wherein the processor is configured to determine a plurality of market potential probability distributions of a number of units of the good in a market associated with the good for the respective plurality of time segments of the period of time, the market potential probability distribution for each time segment assigning a respective probability to each of a plurality of different numbers of units of the good, the market potential probability distribution reflecting an uncertainty in the number of units of the good in the market, and
    wherein the processor is configured to construct, from the price sensitivity and market potential probability distributions for the plurality of time segments, a model of at least one of future demand or future supply for the good over the period of time.

2. An apparatus according to claim 1, wherein for each of at least some of the time segments, the processor being configured to determine a price sensitivity probability distribution includes being configured to:
    determine a price sensitivity probability distribution of a price per unit of the good; and
    recast the price sensitivity probability distribution in a reverse cumulative format when constructing a model of demand, and otherwise recast the price sensitivity probability distribution in a cumulative format when constructing a model of supply.

3. An apparatus according to claim 2, wherein for each of at least some of the time segments, the processor is configured to determine the price sensitivity probability distribution based upon a mean price per unit of the good and an associated standard deviation.

4. An apparatus according to claim 1 wherein the processor is further configured to forecast a market for a respective time segment including being configured to randomly select a predefined number of units of the good from the market potential probability distribution for the respective time segment, wherein the processor is configured to forecast the market before constructing a model of at least one of demand or supply for the respective time segment, and wherein the processor is configured to construct the model of at least one of demand or supply at a respective time segment from the price sensitivity probability distribution and the forecasted market for the respective time segment.

5. An apparatus according to claim 1, wherein the processor being configured to construct a model of at least one of demand or supply includes being configured to construct a model of at least demand, and wherein the processor is further configured to construct a model of cost of the good over the time period, and construct a model of profitability of the good over the time period from the demand model and the cost model.

6. An apparatus according to claim 5, wherein the processor is configured to construct a model of an average cost per unit for the different numbers of units to thereby construct a model of the cost for a time segment, and wherein the processor is configured to subtract the average cost per unit for the different numbers of units from the prices per unit for the respective different numbers of units to thereby construct a model of the profitability for a time segment.

7. An apparatus according to claim 1, wherein for each of at least some of the time segments, the processor being configured to determine a price sensitivity probability distribution and a market potential probability distribution includes being configured to determine a price sensitivity probability distribution and a market potential probability distribution based upon a growth rate and an uncertainty for the time segment.

8. An apparatus according to claim 7, wherein the processor is further configured to define a growth rate for a respective time segment before determining the price sensitivity probability distribution and the market potential probability distribution, wherein the processor is configured to define a growth rate for the respective time segment such that the growth rate for at least one time segment differs from the growth rate of at least one other time segment.

9. An apparatus according to claim 7, wherein the processor is further configured to define a growth rate for a respective time segment before determining the price sensitivity probability distribution and the market potential probability distribution, wherein the processor is configured to define a growth rate for the respective time segment independent of an uncertainty for the respective time segment, and wherein the processor is also configured to determine an uncertainty for the respective time segment independent of a growth rate for the respective time segment.

10. An apparatus according to claim 7, wherein the processor is further configured to determine an uncertainty for a respective time segment such that the uncertainty for at least one time segment differs from the uncertainty of at least one other time segment.

11. An apparatus according to claim 1, wherein the processor being configured to construct a model of at least one of future demand or future supply includes being configured to:
construct a model of at least one of future demand or future supply for the good in a non-differentiated market, the non-differentiated market reflecting a constant transaction-by-transaction price of the good, each transaction involving a purchase of one or more units of the good; and
mathematically integrate the model of at least one of future demand or future supply in the non-differentiated market to thereby construct a model of at least one of future demand or future supply for the good in a corresponding differentiated market, the differentiated market reflecting a differing transaction-by-transaction price of the good, each transaction involving a purchase of one or more units of the good.

12. An apparatus according to claim 1, wherein the processor being configured to determine a plurality of price sensitivity probability distributions and a plurality of market potential probability distributions includes being configured to determine a plurality of price sensitivity probability distributions and a plurality of market potential probability distributions for each of a plurality of independent component markets for the good, and
wherein the processor being configured to construct a model of at least one of future demand or future supply for the good includes being configured to:
construct a model of at least one of future demand or future supply for the good in the component markets based upon respective price sensitivity probability distributions and market potential probability distributions; and
combine the models of at least one of future demand or future supply for the good to thereby construct a model of at least one of future demand or future supply for the good in an aggregate market formed of the component markets.

13. A method performed by execution of computer-readable program code by at least one processor of at least one computer system, the method comprising:
determining, using at least one of the processors, a plurality of price sensitivity probability distributions of a price per unit of a good for a respective plurality of time segments of a period of time, the price sensitivity probability distribution for each time segment assigning a respective probability to each of a plurality of different predetermined prices per unit of the good, the price sensitivity probability distribution reflecting an uncertainty in the price per unit of the good;
determining, using at least one of the processors, a plurality of market potential probability distributions of a number of units of the good in a market associated with the good for the respective plurality of time segments of the period of time, the market potential probability distribution for each time segment assigning a respective probability to each of a plurality of different numbers of units of the good, the market potential probability distribution reflecting an uncertainty in the number of units of the good in the market; and
constructing, using at least one of the processors and from the price sensitivity and market potential probability distributions for the plurality of time segments, a model of at least one of future demand or future supply for the good over the period of time.

14. A method according to claim 13, wherein for each of at least some of the time segments, determining a price sensitivity probability distribution comprises:
determining a price sensitivity probability distribution of a price per unit of the good; and
recasting the price sensitivity probability distribution in a reverse cumulative format when constructing a model of demand, and otherwise recasting the price sensitivity probability distribution in a cumulative format when constructing a model of supply.

15. A method according to claim 14, wherein for each of at least some of the time segments, determining a price sensitivity probability distribution comprises determining a price sensitivity probability distribution based upon a mean price per unit of the good and an associated standard deviation.

16. A method according to claim 13 further comprising forecasting a market for a respective time segment including randomly selecting a predefined number of units of the good from the market potential probability distribution for the respective time segment, wherein forecasting the market occurs before constructing a model of at least one of demand or supply for the respective time segment, and wherein constructing a model of at least one of demand or supply comprises constructing the model of at least one of demand or supply at a respective time segment from the price sensitivity probability distribution and the forecasted market for the respective time segment.

17. A method according to claim 13, wherein constructing a model of at least one of demand or supply comprises constructing a model of at least demand, and wherein the method further comprises:
   constructing a model of cost of the good over the time period; and
   constructing a model of profitability of the good over the time period from the demand model and the cost model.

18. A method according to claim 17, wherein constructing a model of the cost for a time segment comprises constructing a model of an average cost per unit for the different numbers of units, and wherein constructing a model of the profitability for a time segment comprises subtracting the average cost per unit for the different numbers of units from the prices per unit for the respective different numbers of units.

19. A method according to claim 13, wherein for each of at least some of the time segments, determining a price sensitivity probability distribution and a market potential probability distribution comprises determining a price sensitivity probability distribution and a market potential probability distribution based upon a growth rate and an uncertainty for the time segment.

20. A method according to claim 19 further comprising defining a growth rate for a respective time segment before determining a price sensitivity probability distribution and a market potential probability distribution, wherein defining a growth rate for a respective time segment comprises defining a growth rate for the respective time segment such that the growth rate for at least one time segment differs from the growth rate of at least one other time segment.

21. A method according to claim 19 further comprising defining a growth rate for a respective time segment before determining a price sensitivity probability distribution and a market potential probability distribution, wherein defining a growth rate for the respective time segment comprises defining a growth rate for the respective time segment independent of an uncertainty for the respective time segment, and wherein the method further comprises determining an uncertainty for a respective time segment independent of a growth rate for the respective time segment.

22. A method according to claim 19 further comprising determining an uncertainty for a respective time segment such that the uncertainty for at least one time segment differs from the uncertainty of at least one other time segment.

23. A method according to claim 13, wherein constructing a model of at least one of future demand or future supply comprises:
   constructing a model of at least one of future demand or future supply for the good in a non-differentiated market, the non-differentiated market reflecting a constant transaction-by-transaction price of the good, each transaction involving a purchase of one or more units of the good; and
   mathematically integrating the model of at least one of future demand or future supply in the non-differentiated market to thereby construct a model of at least one of future demand or future supply for the good in a corresponding differentiated market, the differentiated market reflecting a differing transaction-by-transaction price of the good, each transaction involving a purchase of one or more units of the good.

24. A method according to claim 13, wherein determining a plurality of price sensitivity probability distributions and a plurality of market potential probability distributions comprise determining a plurality of price sensitivity probability distributions and a plurality of market potential probability distributions for each of a plurality of independent component markets for the good, and wherein constructing a model of at least one of future demand or future supply for the good comprises:
   constructing a model of at least one of future demand or future supply for the good in the component markets based upon respective price sensitivity probability distributions and market potential probability distributions; and
   combining the models of at least one of future demand or future supply for the good to thereby construct a model of at least one of future demand or future supply for the good in an aggregate market formed of the component markets.

25. A computer program product comprising a computer-readable storage medium having computer-readable program code portions stored therein for causing a processor to perform a method when executed by the processor, the computer-readable program portions comprising:
   a first executable portion configured to determine a plurality of price sensitivity probability distributions of a price per unit of a good for a respective plurality of time segments of a period of time, the price sensitivity probability distribution for each time segment assigning a respective probability to each of a plurality of different predetermined prices per unit of the good, the price sensitivity probability distribution reflecting an uncertainty in the price per unit of the good;
   a second executable portion configured to determine a plurality of market potential probability distributions of a number of units of the good in a market associated with the good for the respective plurality of time segments of the period of time, the market potential probability distribution for each time segment assigning a respective probability to each of a plurality of different numbers of units of the good, the market potential probability distribution reflecting an uncertainty in the number of units of the good in the market; and
   a third executable portion configured to construct, from the price sensitivity and market potential probability distributions for the plurality of time segments, a model of at least one of future demand or future supply for the good over the period of time.

26. A computer program product according to claim 25, wherein for each of at least some of the time segments, the first executable portion being configured to determine a price sensitivity probability distribution includes being configured to:
   determine a price sensitivity probability distribution of a price per unit of the good; and
   recast the price sensitivity probability distribution in a reverse cumulative format when constructing a model of demand, and otherwise recasting the price sensitivity probability distribution in a cumulative format when constructing a model of supply.

27. A computer program product according to claim 26, wherein for each of at least some of the time segments, the first executable portion is configured to determine the price sensitivity probability distribution for a time segment based upon a mean price per unit of the good and an associated standard deviation.

28. A computer program product according to claim 25 further comprising a fourth executable portion configured to forecast a market for a respective time segment including being configured to randomly select a predefined number of units of the good from the market potential probability distribution for the respective time segment, wherein the fourth executable portion is configured to forecast the market occurs before the third executable portion constructs a model of at least one of demand or supply for the respective time segment, and wherein the third executable portion is configured to construct the model of at least one of demand or supply at a respective time segment from the price sensitivity probability distribution and the forecasted market for the respective time segment.

29. A computer program product according to claim 25, wherein the third executable portion is configured to construct a model of at least demand, and wherein the computer-readable program portions further comprise:
 a fourth executable portion configured to construct a model of cost of the good over the time period; and
 a fifth executable portion for constructing a model of profitability of the good over the time period from the demand model and the cost model.

30. A computer program product according to claim 29, wherein the fourth executable portion is configured to construct a model of an average cost per unit for the different numbers of units to thereby construct a model of the cost for a time segment, and wherein the fifth executable portion is configured to subtract the average cost per unit for the different numbers of units from the prices per unit for the respective different numbers of units to thereby construct a model of the profitability for a time segment.

31. A computer program product according to claim 25, wherein for each of at least some of the time segments, the first and second executable portions are configured to determine the price sensitivity probability distribution and the market potential probability distribution based upon a growth rate and an uncertainty for the time segment.

32. A computer program product according to claim 31 further comprising a fourth executable portion configured to define a growth rate for a respective time segment before the first and second executable portions determine the price sensitivity probability distribution and the market potential probability distribution, wherein the fourth executable portion is configured to define a growth rate for the respective time segment such that the growth rate for at least one time segment differs from the growth rate of at least one other time segment.

33. A computer program product according to claim 31 further comprising a fourth executable portion configured to define a growth rate for a respective time segment before the first and second executable portions determine the price sensitivity probability distribution and the market potential probability distribution, wherein the fourth executable portion is configured to define a growth rate for the respective time segment independent of an uncertainty for the respective time segment, and wherein the computer-readable program portions further comprise a fifth executable portion configured to determine an uncertainty for a respective time segment independent of a growth rate for the respective time segment.

34. A computer program product according to claim 31 further comprising a fourth executable portion configured to determine an uncertainty for a respective time segment such that the uncertainty for at least one time segment differs from the uncertainty of at least one other time segment.

35. A computer program product according to claim 25, wherein the third executable portion being configured to construct a model of at least one of future demand or future supply includes being configured to:
 construct a model of at least one of future demand or future supply for the good in a non-differentiated market, the non-differentiated market reflecting a constant transaction-by-transaction price of the good, each transaction involving a purchase of one or more units of the good; and
 mathematically integrate the model of at least one of future demand or future supply in the non-differentiated market to thereby construct a model of at least one of future demand or future supply for the good in a corresponding differentiated market, the differentiated market reflecting a differing transaction-by-transaction price of the good, each transaction involving a purchase of one or more units of the good.

36. A computer program product according to claim 25, wherein the first and second executable portions are configured to determine a plurality of price sensitivity probability distributions and a plurality of market potential probability distributions for each of a plurality of independent component markets for the good, and
 wherein the third executable portion being configured to construct a model of at least one of future demand or future supply for the good includes being configured to:
  construct a model of at least one of future demand or future supply for the good in the component markets based upon respective price sensitivity probability distributions and market potential probability distributions; and
  combine the models of at least one of future demand or future supply for the good to thereby construct a model of at least one of future demand or future supply for the good in an aggregate market formed of the component markets.

* * * * *